United States Patent
Tamaru

(10) Patent No.: US 9,818,346 B2
(45) Date of Patent: Nov. 14, 2017

(54) DISPLAY DEVICE AND CONTROL METHOD FOR SAME

(71) Applicant: FUJIFILM Corporation, Tokyo (JP)

(72) Inventor: Masaya Tamaru, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/130,586

(22) Filed: Apr. 15, 2016

(65) Prior Publication Data

US 2016/0232857 A1 Aug. 11, 2016

Related U.S. Application Data

(63) Continuation of application No. PCT/JP2014/077153, filed on Oct. 10, 2014.

(30) Foreign Application Priority Data

Nov. 12, 2013 (JP) .................................. 2013-234117

(51) Int. Cl.
*G09G 3/36* (2006.01)
*G09G 3/34* (2006.01)
(Continued)

(52) U.S. Cl.
CPC .............. *G09G 3/3426* (2013.01); *H04N 5/57* (2013.01); *H04N 21/4318* (2013.01);
(Continued)

(58) Field of Classification Search
CPC ............................... G09G 3/34; G09G 3/3426
(Continued)

(56) References Cited

U.S. PATENT DOCUMENTS

| 8,717,278 B2 * | 5/2014 | Atkins ................. G09G 3/3426 345/102 |
| 8,933,975 B2 * | 1/2015 | Nakanishi ............ G09G 3/3426 345/102 |
| 2006/0214904 A1 | 9/2006 | Kimura et al. |
| 2008/0129677 A1 | 6/2008 | Li et al. |

(Continued)

FOREIGN PATENT DOCUMENTS

| CN | 101425275 A | 5/2009 |
| CN | 102547072 A | 7/2012 |

(Continued)

OTHER PUBLICATIONS

International Preliminary Report on Patentability for PCT/JP2014/077153(PCT/IPEA/409) dated May 13, 2015.
(Continued)

*Primary Examiner* — Roy Rabindranath
(74) *Attorney, Agent, or Firm* — Birch Stewart Kolasch & Birch, LLP

(57) ABSTRACT

On the basis of the image data obtained by the image data acquisition section, a target luminance calculation section calculates a target luminance, which is a target value for the luminance of emitted light for each segment region. An inverse filter acquisition section acquires an inverse filter of a light emission distribution function which represents light emission distribution characteristics of the light source for each segment region. A setting value calculation section calculates a setting value for the luminance of emitted light of the light source for each segment region by performing a convolution operation on the target luminance for each segment region with the inverse filter. On the basis of the setting value for each segment region calculated by the setting value calculation section, a light source control section controls the luminance of emitted light of the light source for each segment region.

11 Claims, 26 Drawing Sheets

(51) Int. Cl.
*H04N 5/57* (2006.01)
*H04N 21/431* (2011.01)

(52) U.S. Cl.
CPC ............... *G09G 2320/0271* (2013.01); *G09G 2320/0646* (2013.01); *G09G 2320/0686* (2013.01); *G09G 2360/16* (2013.01)

(58) Field of Classification Search
USPC .......................................................... 345/102
See application file for complete search history.

(56) References Cited

U.S. PATENT DOCUMENTS

| | | |
|---|---|---|
| 2009/0009456 A1 | 1/2009 | Ohshima |
| 2009/0040398 A1 | 2/2009 | Kasahara |
| 2009/0109165 A1 | 4/2009 | Park et al. |
| 2010/0188435 A1* | 7/2010 | Kim ................ G09G 3/342 345/690 |
| 2011/0292018 A1 | 12/2011 | Kubota et al. |
| 2012/0163729 A1 | 6/2012 | Mogi et al. |
| 2015/0116376 A1* | 4/2015 | Kimura ............ G09G 3/3406 345/690 |

FOREIGN PATENT DOCUMENTS

| | | |
|---|---|---|
| JP | 9-269370 A | 10/1997 |
| JP | 2007-34251 A | 2/2007 |
| JP | 2008-139871 A | 6/2008 |
| JP | 2008-304908 A | 12/2008 |
| JP | 2009-42838 A | 2/2009 |
| JP | 2009-109975 A | 5/2009 |
| JP | 2011-248215 A | 12/2011 |
| JP | 2012-141725 A | 7/2012 |
| TW | 201211985 A | 5/2009 |
| WO | WO 2012/023326 A1 | 2/2012 |

OTHER PUBLICATIONS

International Search Report for PCT/JP2014/077153(PCT/ISA/210) dated Dec. 22, 2014.

Written Opinion of the International Searching Authority for PCT/JP2014/077153(PCT/ISA/237) dated Dec. 22, 2014.

Chinese Office Action dated Jul. 19, 2017 in counterpart Chinese Application No. 201480061930.6.

* cited by examiner

FIG. 25
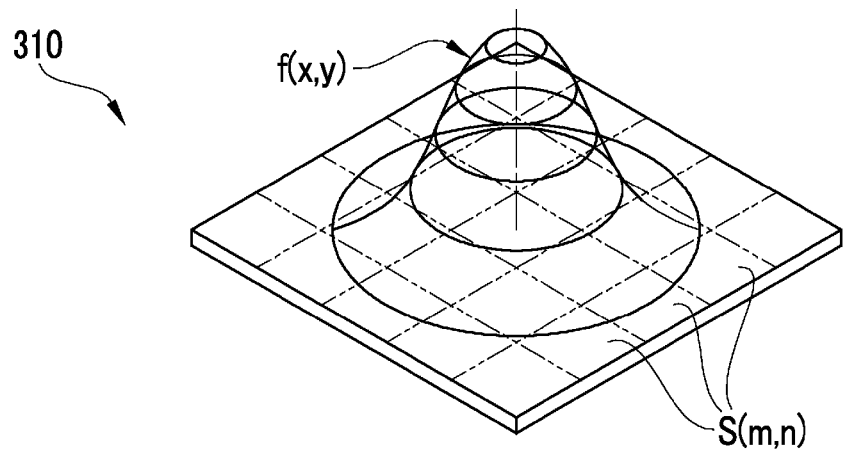
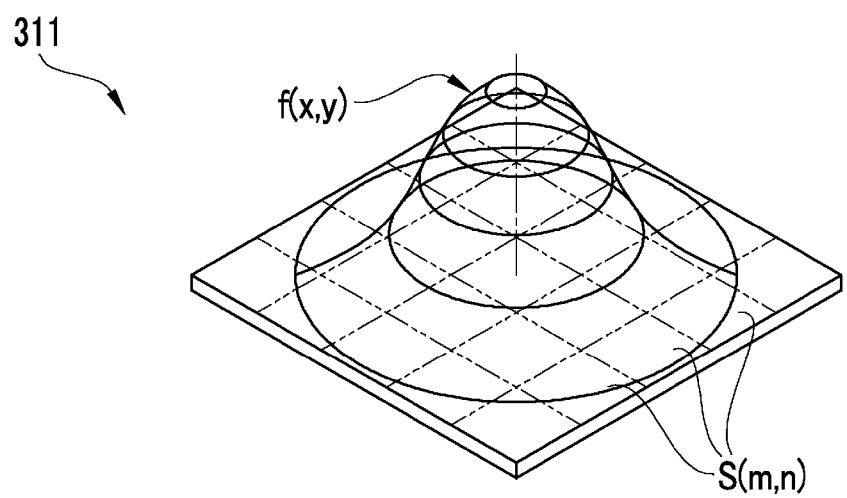
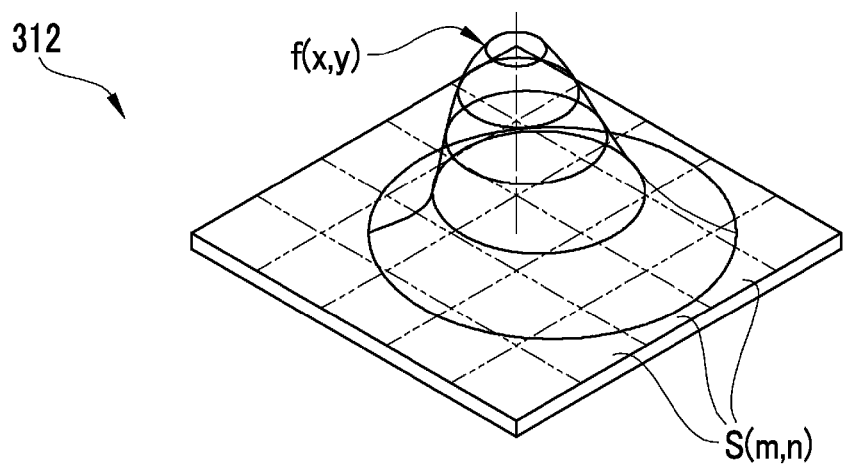

DISPLAY DEVICE AND CONTROL METHOD FOR SAME

CROSS-REFERENCE TO RELATED APPLICATIONS

This application is a Continuation of PCT International Application No. PCT/JP2014/077153 filed on Oct. 10, 2014, which claims priority under 35 U.S.C. §119(a) to Japanese Patent Application No. 2013-234117 filed on Nov. 12, 2013. Each of the above applications is hereby expressly incorporated by reference, in their entirety, into the present application.

BACKGROUND OF THE INVENTION

1. Field of the Invention

The present invention relates to a display device, which separately controls a luminance of emitted light for each segment region, and a control method for the same.

2. Description of the Related Art

Most portable terminals such as tablet terminals and smartphones, digital cameras, TVs, and various monitors have liquid crystal display devices (display devices). Liquid crystal display devices comprise: a liquid crystal panel in which a light transmittance is adjustable for each pixel; and a backlight (light source) that irradiates the liquid crystal panel with light.

In recent years, as one of the liquid crystal display devices, there has been known a liquid crystal display device that performs backlight local dimming (hereinafter abbreviated as BLD) control by using a backlight which is capable of separately controlling the luminance of emitted light for each segment region which is obtained by segmenting a display region of a liquid crystal panel into a plurality of pieces. In the backlight, a single or a plurality of light emitting diodes (hereinafter abbreviated as LED) for separately illuminating the respective segment regions is disposed. In addition, the "display luminance" in the present description is a luminance which is measured from pixels (liquid crystal elements) of the liquid crystal panel, and is defined by a product between a transmittance of the pixels and the luminance of emitted light of the LED.

Under the BLD control, in a case where an image includes a dark portion in which a luminance is locally low, and a bright portion in which a luminance is locally high, black floating of the dark part is reduced by decreasing the luminance of emitted light of the segment regions corresponding to the dark portion. Thereby, a contrast ratio of a displayed image, which is displayed in the display region, increases. Therefore, in the liquid crystal display device capable of performing the BLD control (hereinafter simply referred to as a liquid crystal display device), image quality of the displayed image is improved.

In the liquid crystal display device, it is determined whether or not there is a margin capable of an increase in gain (an increase in light transmittance) of pixel values of pixels, for each segment region. In a case where there is a margin, correction is performed such that the luminance of emitted light of the LED is decreased and the gain of the pixel values is increased. For example, in a case where a peak value of the pixel values within the segment region is a ½ of the maximum value allowable in the pixel values, the gain of the pixel value of each pixel within the segment region is increased to twice its original value, and the luminance of emitted light of the LED is reduced to ½ of its original value. Thereby, it is possible to increase the contrast ratio of the displayed image while reducing power consumption.

In the liquid crystal display device that performs the correction, a setting value (hereinafter referred to as a LED setting value) of a luminance of emitted light of the LED is calculated for each segment region. On the basis of this calculation result, light emission of the LED of each segment region is controlled. Here, in the liquid crystal display device in the related art, it is assumed that LED light of a certain segment region does not leak into peripheral segment regions, and under the assumption, the LED setting value is calculated for each segment region. However, it is extremely difficult to realize a liquid crystal display device satisfying the assumption. For this reason, in the liquid crystal display device, in a case where an LED in a single segment region emits light, light emitted from the LED leaks into peripheral segment regions, and therefore it is difficult to set an appropriate LED setting value under the assumption.

Accordingly, in the liquid crystal display device described in JP2007-34251A, contribution percentages of the luminances of emitted light of the LED between the segment regions are calculated in advance, and the LED setting value of each segment region is calculated by solving a simultaneous equation using the contribution percentages.

In the liquid crystal display device described in JP2011-248215A, region coefficients indicating amounts of light leakage between adjacent segment regions are provided in three stages (strong, medium, and weak), for example, and the LED setting value of a certain segment region is corrected with any of the region coefficients having three stages. Consequently, in the liquid crystal display device, by adding up the amounts of light leakage from the peripheral segment regions in a certain segment region, a difference in luminance between adjacent segment regions is reduced.

SUMMARY OF THE INVENTION

In the liquid crystal display device of JP2007-34251A, the LED setting value of each segment region is calculated by solving simultaneous equations, but for example, in order to display a moving image, it is necessary to solve simultaneous equations in real time for each frame image. However, solving simultaneous equations in real time is difficult in practice, and a method of solving simultaneous equations in real time is not disclosed in JP2007-34251A. Accordingly, in the liquid crystal display device of JP2007-34251A, there is a concern about occurrence of a delay in image display.

In the liquid crystal display device of JP2011-248215A, the LED setting value is corrected with any of the region coefficients having three predetermined stages. Therefore, in accordance with the image data, any of the region coefficients having three stages may not be appropriate. Accordingly, in the liquid crystal display device of JP2011-248215A, an ideal LED setting value may not be calculated.

An object of the present invention is to provide a display device, which is capable of calculating an optimal setting value for the luminance of emitted light of the light source for each segment region in real time, and a control method for the same.

In order to achieve the object of the present invention, there is provided a display device comprising: a non-self-luminous display panel; a light source that separately controls a luminance of emitted light for each segment region which is obtained by segmenting a display region of the non-self-luminous display panel into a plurality of pieces; an image data acquisition section that acquires image data; a target luminance calculation section that calculates a target luminance as a target value of the luminance of emitted light for each segment region, on the basis of the image data acquired by the image data acquisition section; an inverse filter acquisition section that acquires an inverse filter of a light emission distribution function which represents light emission distribution characteristics of the light source for each segment region; a setting value calculation section that calculates a setting value for the luminance of emitted light of the light source for each segment region, by performing a convolution operation on the target luminance for each segment region, which is calculated by the target luminance calculation section, with the inverse filter which is acquired by the inverse filter acquisition section; and a light source control section that controls the luminance of emitted light of the light source for each segment region on the basis of the setting value for each segment region which is calculated by the setting value calculation section.

According to the present invention, in consideration of light emission distribution characteristics of the light source, that is, leakage of light from a certain segment region into peripheral segment regions, it is possible to calculate the setting value for the luminance of emitted light of the light source for each segment region in real time.

It is preferable that the inverse filter acquisition section acquires the inverse filter that is calculated by an inverse filter calculation section which calculates the inverse filter of the light emission distribution function by using a Wiener filter. Since the Wiener filter is a filter for minimizing an error between a real luminance and the target luminance, it is possible to calculate an inverse filter (filter coefficient) capable of effectively minimizing loss in gray-level information of a displayed image.

It is preferable that the display device further comprises a high-frequency restriction processing section that performs high-frequency restriction processing, which is for restricting an increase in amplitude on a higher frequency side than a specific spatial frequency, on the inverse filter which is acquired by the inverse filter acquisition section, in which the setting value calculation section performs the convolution operation by using the inverse filter subjected to the high-frequency restriction processing. Thereby, it is possible to suppress loss in gray-level information of a displayed image caused by disturbance in luminance distribution of the backlight luminance, that is, occurrence of deterioration in image quality caused by excessive highlighting.

It is preferable that the inverse filter acquisition section acquires the inverse filter on which high-frequency restriction processing is performed by a high-frequency restriction processing section that performs the high-frequency restriction processing for restricting an increase in amplitude on a higher frequency side than a specific spatial frequency. In addition, it is preferable that the setting value calculation section performs the convolution operation by using the inverse filter subjected to the high-frequency restriction processing. Thereby, it is possible to suppress loss in gray-level information of a displayed image caused by disturbance in luminance distribution of the backlight luminance, that is, occurrence of deterioration in image quality caused by excessive highlighting.

It is preferable that the display device further comprises a window function multiplication processing section that multiplies a window function by filter coefficients of the inverse filter which are acquired by the inverse filter acquisition section, in which the setting value calculation section performs the convolution operation by using the inverse filter after the multiplication processing of the window function. Thereby, it is possible to minimize an increase in circuit size and a delay in processing.

It is preferable that the display device further comprises an inverse filter storage section that stores the inverse filters for the light emission distribution functions having a plurality of different types in accordance with either positions of the segment regions within the display region or characteristics of the light source for respective segment regions, or both, in which the inverse filter acquisition section acquires the plurality of types of the inverse filters from the inverse filter storage section, and in which the setting value calculation section selects the inverse filter corresponding to each segment region, and performs the convolution operation thereon. Thereby, it is possible to accurately minimize information loss of gray-level information of a displayed image.

It is preferable that the display device further comprises a correspondence relationship storage section that stores a correspondence relationship between the segment region and the inverse filter corresponding to the pertinent segment region for each segment region, in which the setting value calculation section selects the inverse filter corresponding to each segment region with reference to the correspondence relationship storage section. Thereby, it is possible to accurately minimize information loss of gray-level information of a displayed image.

It is preferable that the target luminance calculation section calculates a representative value of pixel values of the image data of each segment region, and determines the target luminance of each segment region on the basis of a calculation result of the representative value. It is possible to determine an appropriate target luminance for each segment region.

It is preferable that the representative value is a peak value of the pixel values. In a segment region having a relatively small peak value, it is possible to decrease the luminance of emitted light of the light source. Therefore, it is possible to achieve power saving.

It is preferable that the display device further comprises: an estimation section that estimates the luminance of emitted light of the display region on the basis of the setting value for each segment region which is calculated by the setting value calculation section; a gray-level correction section that performs gray-level correction on the pixel values of the image data on the basis of an estimation result of the estimation section; and a panel control section that controls driving of pixels of the non-self-luminous display panel on the basis of the pixel values after the gray-level correction performed by the gray-level correction section. It is possible to appropriately control a display luminance of the non-self-luminous display panel.

In order to achieve the object of the present invention, there is provided a control method for a display device including a non-self-luminous display panel and a light source that separately controls a luminance of emitted light for each segment region which is obtained by segmenting a display region of the non-self-luminous display panel into a plurality of pieces, the control method comprising: an image data acquisition step of acquiring image data; a target luminance calculation step of calculating a target luminance as a target value of the luminance of emitted light for each segment region, on the basis of the image data acquired in the image data acquisition step; an inverse filter acquisition step of acquiring an inverse filter of a light emission distribution function which represents light emission distribution characteristics of the light source for each segment region;

a setting value calculation step of calculating a setting value for the luminance of emitted light of the light source for each segment region, by performing a convolution operation on the target luminance for each segment region, which is calculated in the target luminance calculation step, with the inverse filter which is acquired in the inverse filter acquisition step; and a light source control step of controlling the luminance of emitted light of the light source for each segment region on the basis of the setting value for each segment region which is calculated in the setting value calculation step.

According to the display device and the control method of the present invention, it is possible to calculate an optimal setting value for the luminance of emitted light of the light source for each segment region in real time.

BRIEF DESCRIPTION OF THE DRAWINGS

FIG. 25 is an explanatory diagram for explaining a plurality of types of light emission distribution functions.

DESCRIPTION OF THE PREFERRED EMBODIMENTS

[Liquid Crystal Display Device of First Embodiment]
<Overall Configuration of Liquid Crystal Display Device>

Figure 1:
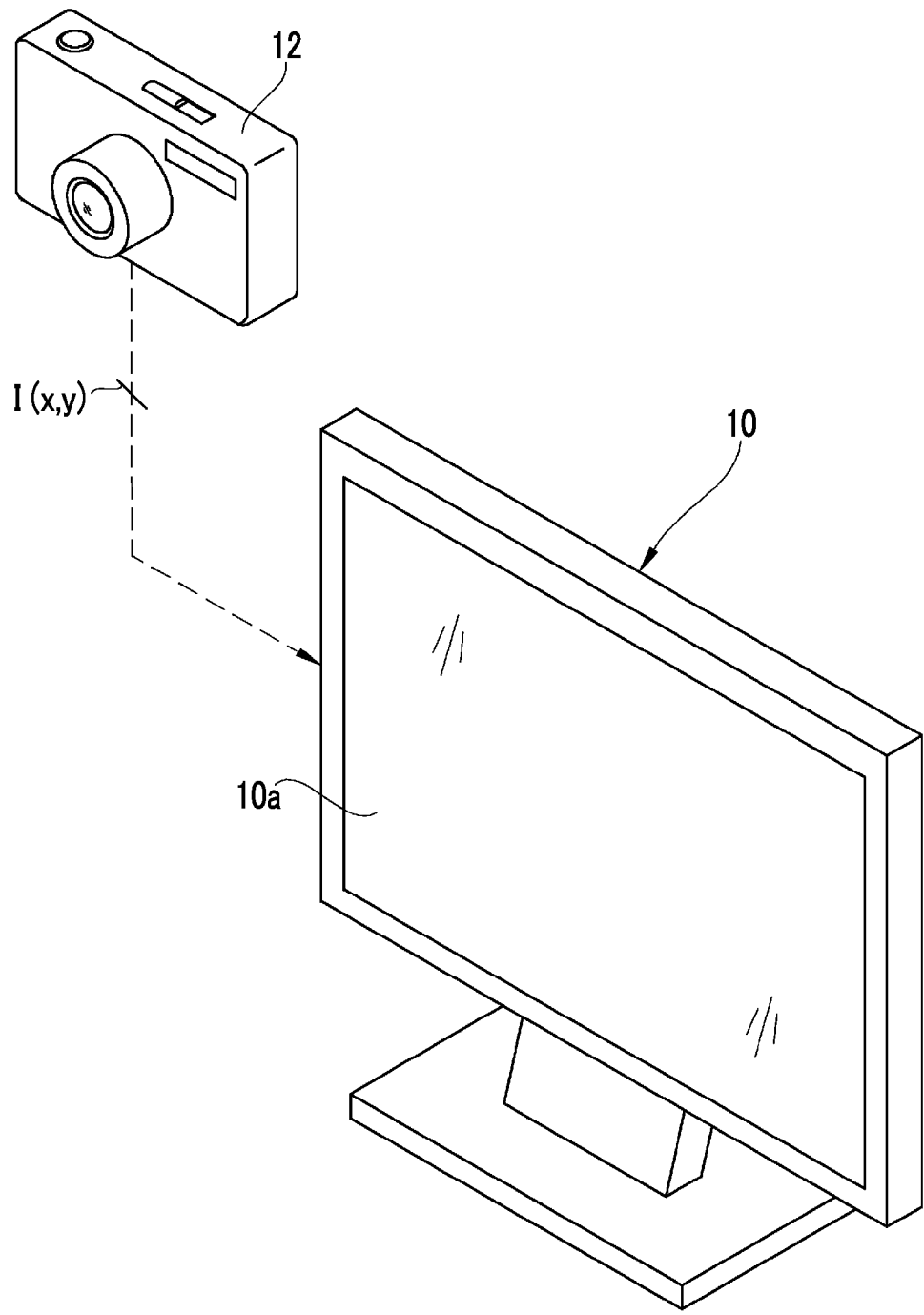
FIG. 1 is a perspective view of a liquid crystal display device.

As shown in FIG. 1, a liquid crystal display device (display device) 10 having a BLD control function acquires image data $I(x, y)$ of a still image or a moving image from a digital camera 12 connected in a wired or wireless manner, and displays the image. Here, coordinates (x, y) mean coordinates of a pixel unit of an image and a liquid crystal panel 15 (refer to FIG. 2). It should be noted that the liquid crystal display device 10 may acquire the image data $I(x, y)$ through a portable terminal, the Internet, television broadcast, and the like, instead of the digital camera 12, and may display an image.

Figure 2:
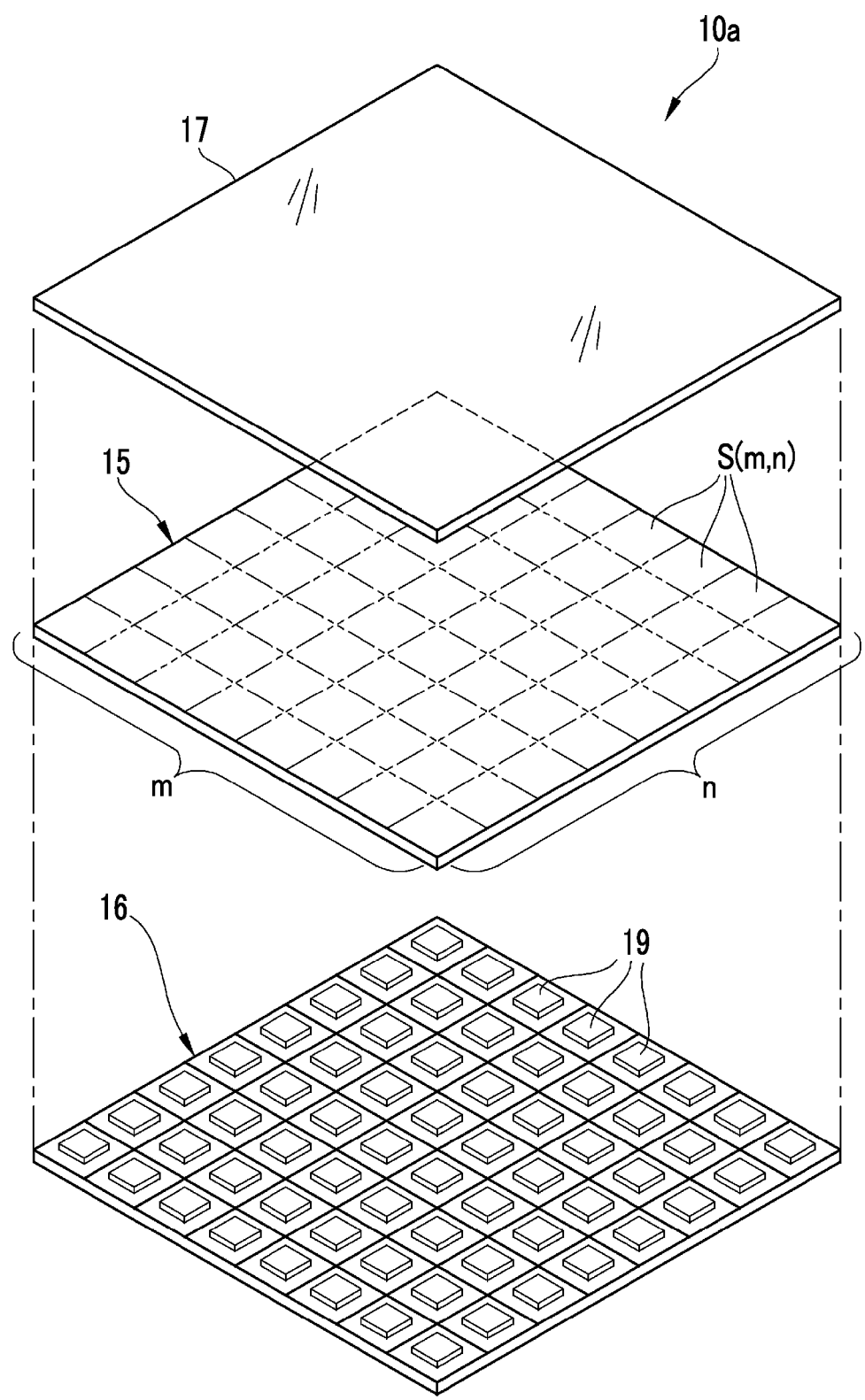
FIG. 2 is an exploded perspective view of a display section of the liquid crystal display device.

As shown in FIG. 2, a display section 10a of the liquid crystal display device 10 mainly includes a liquid crystal panel (non-self-luminous display panel) 15, a backlight (light source) 16, and a protection panel 17. In the liquid crystal panel 15, multiple liquid crystal elements are arranged. Thereby, the liquid crystal panel 15 is able to adjust a transmittance of light for each pixel. In addition, in a case of viewing a stereoscopic image (3D image), the liquid crystal panel 15 capable of stereoscopic viewing with a lenticular lens or the like may be used.

A display region of the liquid crystal panel 15 is segmented into m×n (both m and n are natural numbers equal to or greater than 2) segment regions S(m, n). Here, coordinates (m, n) mean coordinates of the segment region S(m, n) of a pixel q(x, y). For example, in a case where the display region of the liquid crystal panel 15 is segmented into 64 pieces, m=1 to 8, and n=1 to 8. Accordingly, the segment regions S(m, n) may represent all of a segment region 1, a segment region 2, . . . a segment region m·n.

Figure 3:
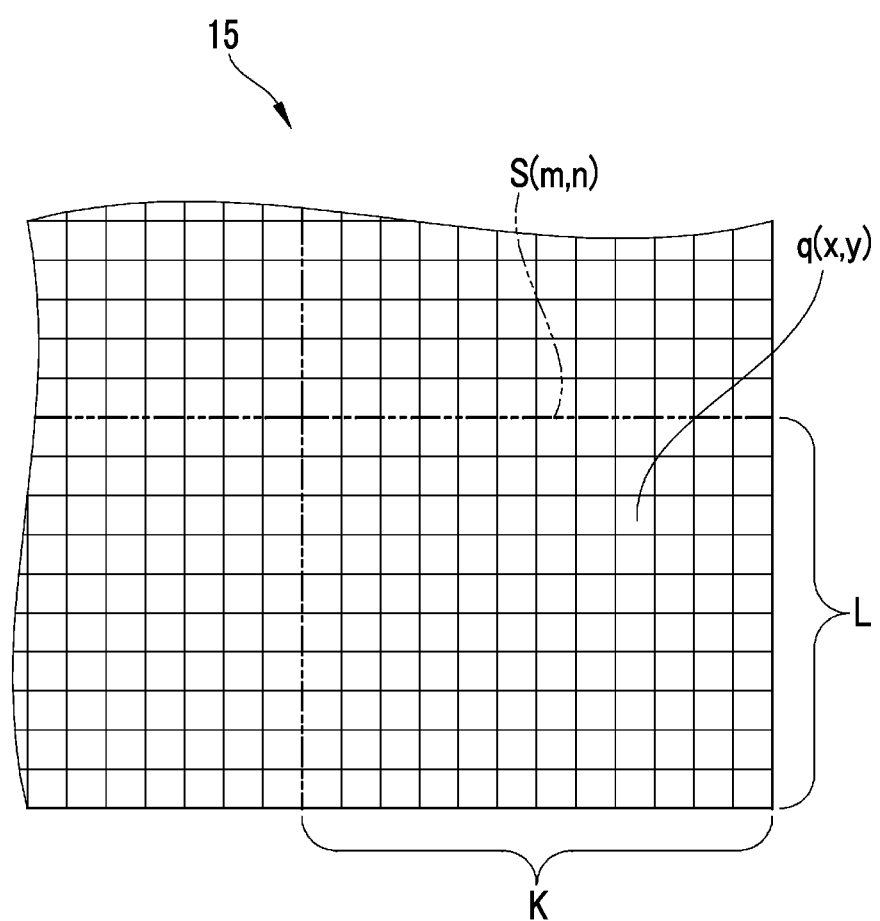
FIG. 3 is an enlarged view of a liquid crystal panel.

As shown in FIG. 3, a single segment region S(m, n) is a region having horizontally K pixels×vertically L pixels (K and L are arbitrary natural numbers). Accordingly, the single segment region S(m, n) includes K×L pixels q(x, y).

As shown in the following Expression (1), a display luminance $V(x, y)$ of a pixel $q(x, y)$ of the liquid crystal panel 15 indicates a product between a panel transmittance $P(x, y)$ of the pixel $q(x, y)$ and a backlight luminance $B(x, y)$ at a position of the pixel (refer to FIG. 4). In addition, a panel transmittance $P(x, y)$ is defined by pixel values of a displayed image (image data $I(x, y)$) which are input to the pixels q(x, y), and a backlight luminance B(x, y) is defined by LED setting values of the segment regions S(m, n) around positions of the pixels.

$$V(x,y) = P(x,y) \cdot B(x,y) \quad (1)$$

Returning to FIG. 2, the backlight 16 is disposed on the rear side of the liquid crystal panel 15. The backlight 16 separately controls a luminance of emitted light for each segment region S(m, n). In the backlight 16, n×m LEDs 19, which separately illuminate respective segment regions S(m, n), are arranged. By separately controlling the amounts of emitted light of the LEDs 19, BLD control for separately controlling the luminances of emitted light of respective segment regions S(m, n) can be performed. For example, in a case of performing pulse width modulation (PWM) control on the amounts of emitted light of LEDs 19, by separately changing duty ratios of PWM in response to the LED setting values E(m, n) of the respective segment regions S(m, n), it is possible to control the amount of emitted light of each LED 19. In addition, in the drawing, a single LED 19 is disposed for a single segment region S(m, n), but a plurality of LEDs 19 may be disposed. Further, a light source other than the LED may be used.

A protection panel 17 is a transparent plate which is disposed on the front side of the liquid crystal panel 15. The protection panel 17 protects the front surface of the liquid crystal panel 15. In addition, instead of the protection panel 17, an operation panel (touch panel), which is operated by a finger of a user (viewer) and a stylus pen and detects a single or a plurality of coordinates, may be used.

Figure 4:
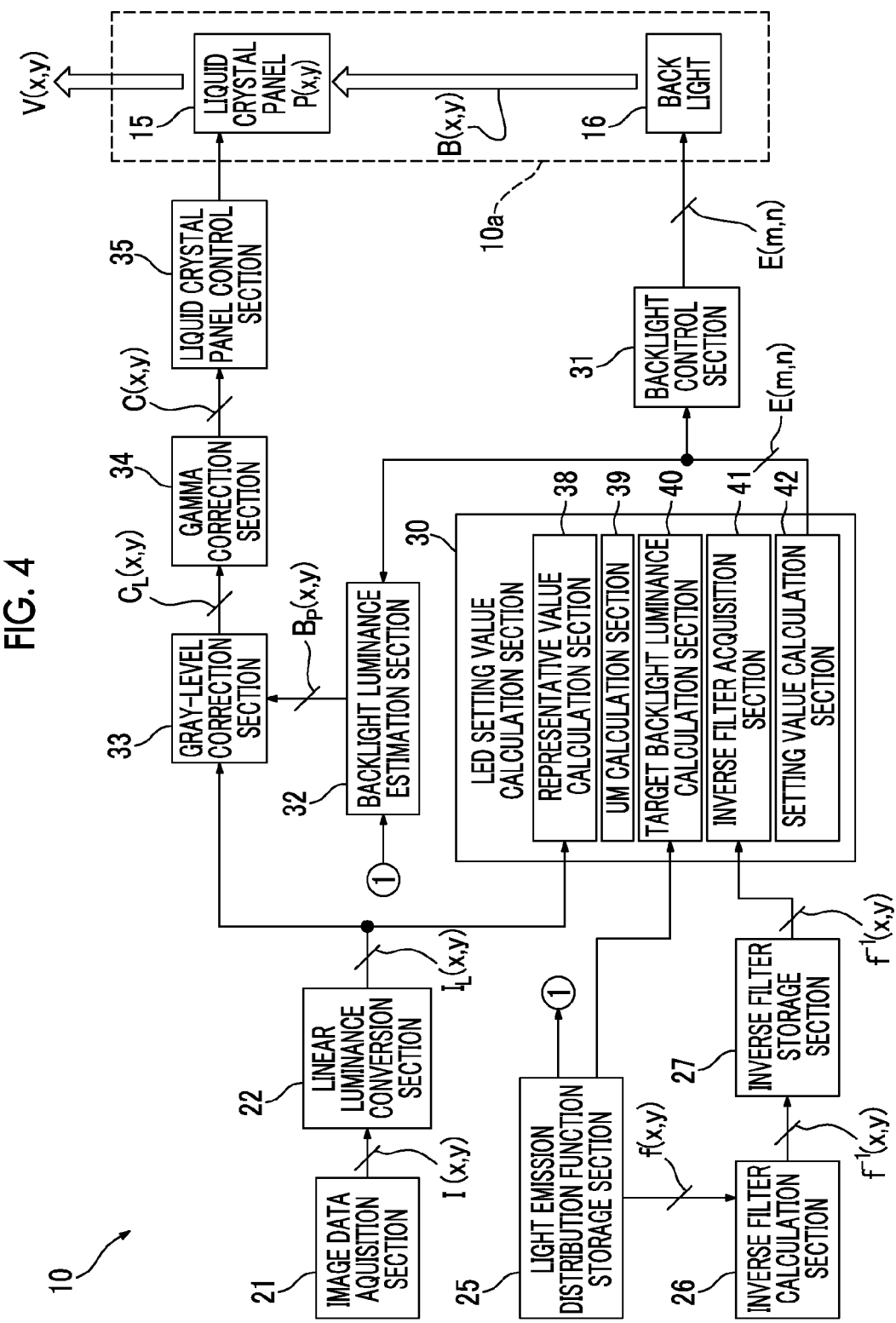
FIG. 4 is a block diagram illustrating an electrical configuration of a liquid crystal display device of a first embodiment.

As shown in FIG. 4, in addition to the above-mentioned display section 10a, the liquid crystal display device 10 has an image data acquisition section 21, a linear luminance conversion section 22, a light emission distribution function storage section 25, an inverse filter calculation section 26, an inverse filter storage section 27, an LED setting value calculation section 30, a backlight control section (light source control section) 31, a backlight luminance estimation section 32, a gray-level correction section 33, a gamma correction section 34, and a liquid crystal panel control section (panel control section) 35.

The image data acquisition section 21 is a connection interface that is connected to the digital camera 12 (connectable through the above-mentioned Internet or the like). The image data acquisition section 21 acquires the image data I(x, y) from the digital camera 12, and outputs the data to the linear luminance conversion section 22. Here, "(x, y)" in "I(x, y)" indicates a pixel value corresponding to each pixel q(x, y) of the displayed image and the liquid crystal panel 15. In addition, in the present embodiment, each pixel value is normalized, and indicated by 0 to 1. For example, in a case where the pixel value is "1", the transmittance of the pixel q(x, y) of the liquid crystal panel 15 is at the maximum. In contrast, in a case where the pixel value is "0", the transmittance of the pixel q(x, y) is at the minimum.

The linear luminance conversion section 22 performs linear luminance conversion processing (reproduction gray-level conversion) on the image data I(x, y) which is input from the image data acquisition section 21, thereby converting the image data I(x, y) into image data $I_L(x, y)$ in which the luminance is linear. For example, the image data I(x, y), which is obtained through imaging of the digital camera 12 or the like, is subjected to gray-level conversion processing (normally, the power of 0.45) which is referred to as gamma correction. Hence, the linear luminance conversion section 22 converts the image data I(x, y) into a value to the power of 2.2 which is an inverse of a value to the power of 0.45.

The linear luminance conversion section 22 outputs the image data $I_L(x, y)$ to each of the LED setting value calculation section 30 and the gray-level correction section 33.

The light emission distribution function storage section 25 stores a light emission distribution function f(x, y) in advance that indicates light emission distribution characteristics of a single LED 19 which is disposed for each segment region S(m, n). Although described later in detail (refer to FIG. 10), the light emission distribution function f(x, y) is a known value which is obtained in advance through measurement at the time of manufacturing or designing of the liquid crystal panel 15. The light emission distribution function f(x, y) is stored in the light emission distribution function storage section 25 on the basis of, for example, factory settings, setting obtained through a communication network, or setting obtained through a user's input operation or the like.

Although described later in detail, the inverse filter calculation section 26 calculates an inverse filter $f^{-1}(x, y)$ of the light emission distribution function f(x, y) which is read from the light emission distribution function storage section 25, and stores the inverse filter $f^{-1}(x, y)$ in the inverse filter storage section 27. The light emission distribution function f(x, y) is a fixed value without consideration of time degradation of the LEDs 19. Therefore, it is preferable that the inverse filter calculation section 26 calculates the inverse filter $f^{-1}(x, y)$ basically once. In addition, storing a new light emission distribution function f(x, y) in the light emission distribution function storage section 25 whenever a predetermined time period passes, and calculating the inverse filter $f^{-1}(x, y)$ through the inverse filter calculation section 26 may be repeated, and the inverse filter $f^{-1}(x, y)$ within the inverse filter storage section 27 may be renewed.

Although described later in detail, the LED setting value calculation section 30 calculates an LED setting value E(m, n) which is a setting value of the luminance of emitted light of the LED 19 of each segment region S(m, n), on the basis of the image data $I_L(x, y)$, which is input from the linear luminance conversion section 22, and the inverse filter $f^{-1}(x, y)$ which is read from the inverse filter storage section 27. Then, the LED setting value calculation section 30 outputs a calculation result of the LED setting value E(m, n) to each of the backlight control section 31 and the backlight luminance estimation section 32.

The backlight control section 31 controls the luminance of emitted light of the LED 19 of each segment region S(m, n), on the basis of the LED setting value E(m, n) which is input from the LED setting value calculation section 30. Thereby, the backlight luminance B(x, y) at the position of each pixel q(x, y) of the liquid crystal panel 15 is defined.

The backlight luminance estimation section 32 estimates luminance distribution of the backlight 16, that is, the backlight luminance B(x, y) at the position of each pixel q(x, y) of the liquid crystal panel 15, on the basis of the LED setting value E(m, n) which is input from the LED setting value calculation section 30. Specifically, the backlight luminance estimation section 32 performs processing of a convolution operation between the LED setting value function E(x, y) [refer to FIG. 9], which is obtained from the LED setting value E(m, n), and the light emission distribution function f(x, y) which is read from the light emission distribution function storage section 25, thereby calculating an estimated backlight luminance $B_P(x, y)$ (refer to Expression (12) to be described later). In addition, the estimated backlight luminance $B_P(x, y)$ is normalized, and indicated by 0 to 1. The backlight luminance estimation section 32 outputs the estimated backlight luminance $B_P(x, y)$, which is an estimation result of the backlight luminance $B(x, y)$, to the gray-level correction section 33.

As described later in detail, the gray-level correction section 33 calculates an image signal $C_L(x, y)$ of which a gray level is corrected, on the basis of the image data $I_L(x, y)$, which is input from the linear luminance conversion section 22, and the estimated backlight luminance $B_P(x, y)$ which is input from the backlight luminance estimation section 32 (refer to Expression (8) to be described later). This image signal $C_L(x, y)$ is also normalized, and the pixel value thereof is indicated by 0 to 1. Then, the gray-level correction section 33 outputs the image signal $C_L(x, y)$ to the gamma correction section 34.

The gamma correction section 34 performs, for example, gamma correction processing of the power of 0.45 ($\approx 1/2.2$) on the image signal $C_L(x, y)$ which has a linear luminance, thereby once again converting the image signal $C_L(x, y)$ into an image signal $C(x, y)$ which is subjected to gamma correction the same as that of the image data $I(x, y)$. The gamma correction section 34 outputs the image signal $C(x, y)$ to the liquid crystal panel control section 35.

The liquid crystal panel control section 35 controls the panel transmittance $P(x, y)$ of each pixel $q(x, y)$ of the liquid crystal panel 15, on the basis of the image signal $C(x, y)$ which is input from the gamma correction section 34. Thereby, the panel transmittance $P(x, y)$ is defined in accordance with the characteristics of the liquid crystal panel 15. In addition, the panel transmittance $P(x, y)$ is generally represented by the following Expression (2).

$$P(x,y) = a_P C(x,y)^{2.2} + b_P = a_P C_L(x,y) + b_P \quad (2)$$

In Expression (2) mentioned above, $a_P$ and $b_P$ are parameters defined by characteristics of the liquid crystal panel 15, where the $a_P$ indicates a panel transmittance coefficient of the liquid crystal panel 15, and the $b_P$ indicates a panel black floating transmittance of the liquid crystal panel 15. The $b_P$ of a general liquid crystal panel 15 is a value greater than 0, and therefore even in a case where the image signal $C_L(x, y)=0$, light of the backlight 16 is transmitted through the liquid crystal panel 15. Hence, an observer feels that black floating occurs in a dark portion of a displayed image. Further, in a case where the image signal $C_L(x, y)=1$, the transmittance of the liquid crystal panel 15 is at the maximum, and light is not transmitted any more. On the basis of the panel transmittance $P(x, y)$ and the backlight luminance $B(x, y)$ defined as described above, the display luminance $V(x, y)$ is defined on the basis of Expression (1) mentioned above.

<Overview of Upper Margin (UM) Correction>

In the liquid crystal display device 10 that performs the BLD control, as described above, a contrast ratio of a displayed image is increased while reducing power consumption. Thus, in a case where there is a margin capable of an increase in gain (an increase in light transmittance) in the pixel values of the respective pixels $q(x, y)$, the backlight luminance $B(x, y)$ is decreased, and the gain of the pixel value is increased.

Figure 5:
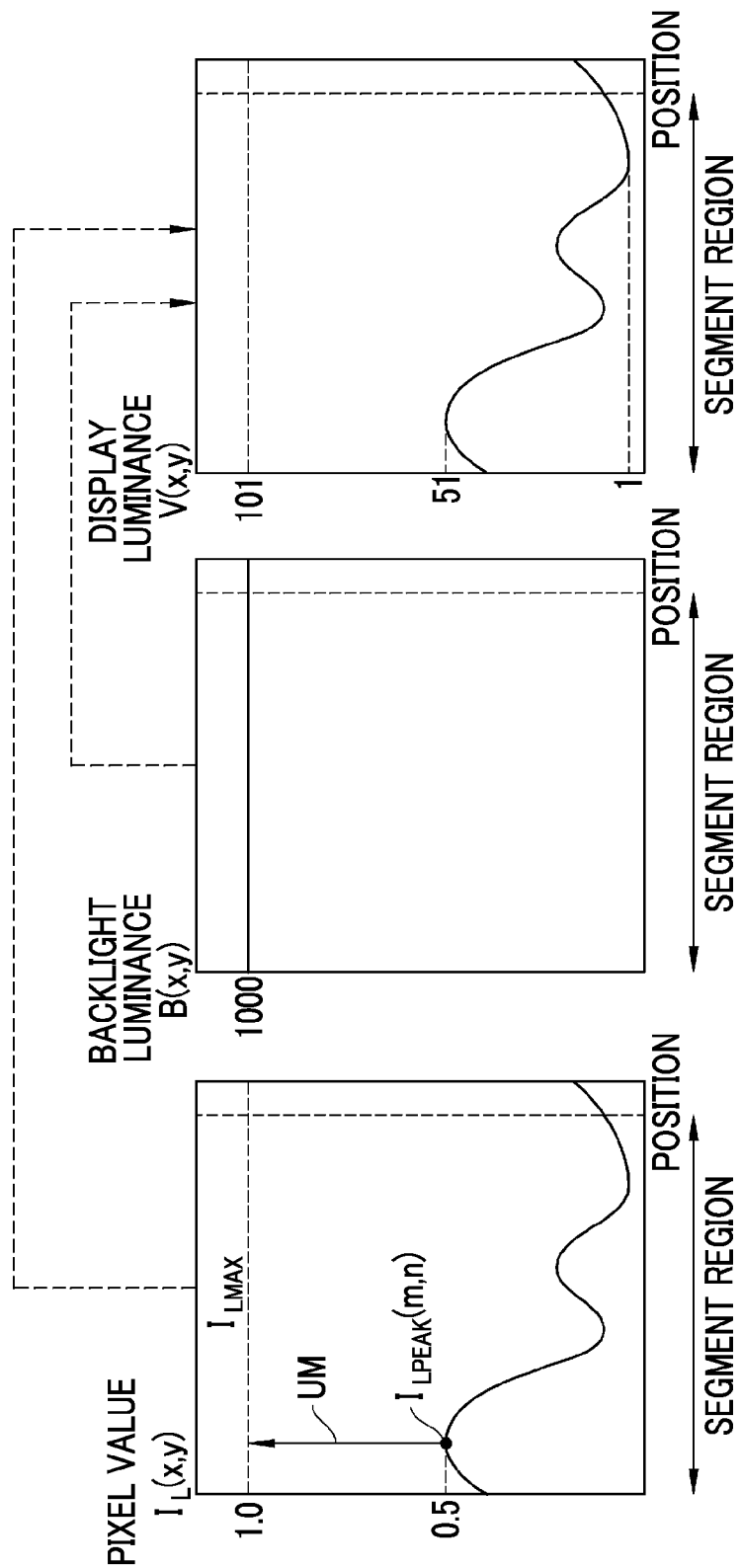
FIG. 5 is an explanatory diagram for explaining a display luminance in a case where UM correction is not performed.
Figure 6:
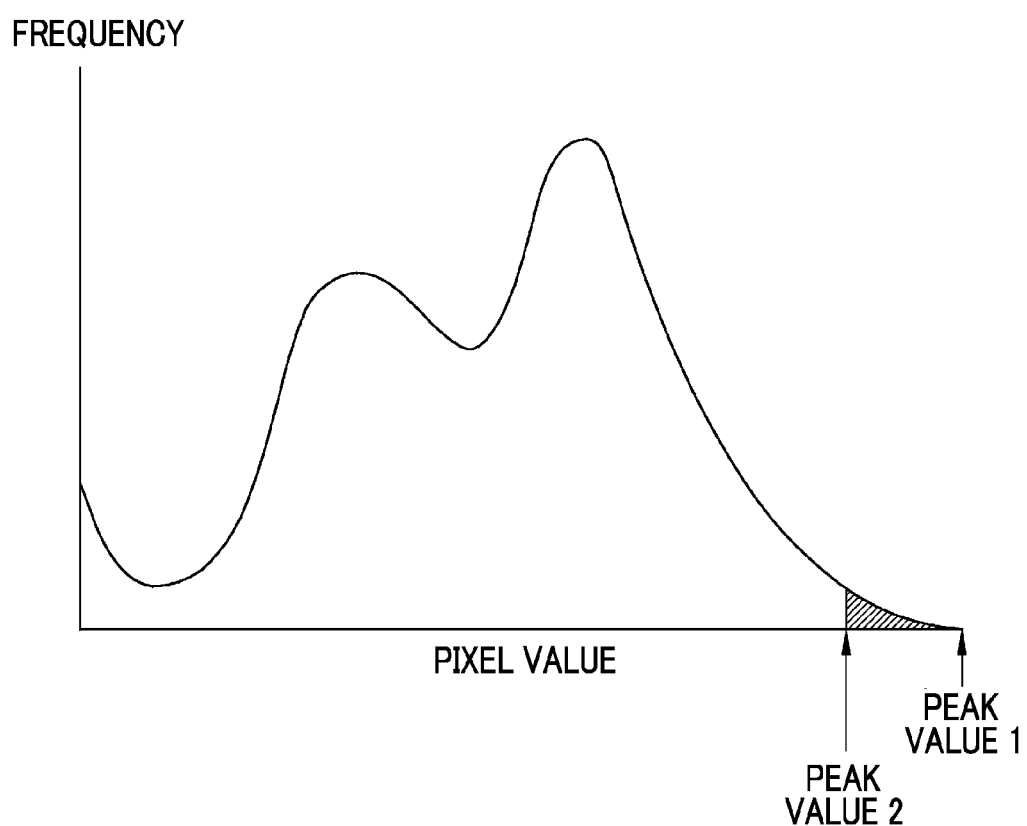
FIG. 6 is an explanatory diagram for explaining peak values of values of all pixels within a segment region.

As shown in FIG. 5, a representative value calculation section 38 of the LED setting value calculation section 30 calculates a representative value $I_{LPEAK}(m, n)$ of the image data $I_L(x, y)$ of each segment region $S(m, n)$ from the image data $I_L(x, y)$ which is input from the linear luminance conversion section 22. Here, the representative value $I_{LPEAK}(m, n)$ is a peak value of the pixel values of the K×L pixels $q(x, y)$ within the segment region $S(m, n)$. Further, as shown in FIG. 6, the "peak value" described herein is not limited to a real peak value (a peak value I in the drawing). In order to minimize effects of an impulse system on noise, for example, a pixel value, of which a cumulative frequency from the upper side of all the pixel values within the segment region $S(m, n)$ corresponds to a level of 1%, may be used as a "peak value" (a peak value 2 in the drawing). The representative value calculation section 38 outputs the representative value $I_{LPEAK}(m, n)$ of each segment region $S(m, n)$ to a UM calculation section 39.

The UM calculation section 39 (refer to FIG. 4) calculates how much a margin capable of an increase in gain of the representative value $I_{LPEAK}(m, n)$ is relative to the maximum value $I_{LMAX}$ (here 1) allowable in the pixel values, for each segment region $S(m, n)$, on the basis of the representative value $I_{LPEAK}(m, n)$ which is input from the representative value calculation section 38. If a margin (Upper Margin) of each segment region $S(m, n)$ is set as a $UM(m, n)$, the UM calculation section 39 calculates the $UM(m, n)$ by using the following Expression (3). The $UM(m, n)$ is essentially a value equal to or greater than 1 $[UM(m, n) \geq 1]$.

$$UM(m,n) = I_{LMAX}/I_{LPEAK}(m,n) \quad (3)$$

Figure 7:
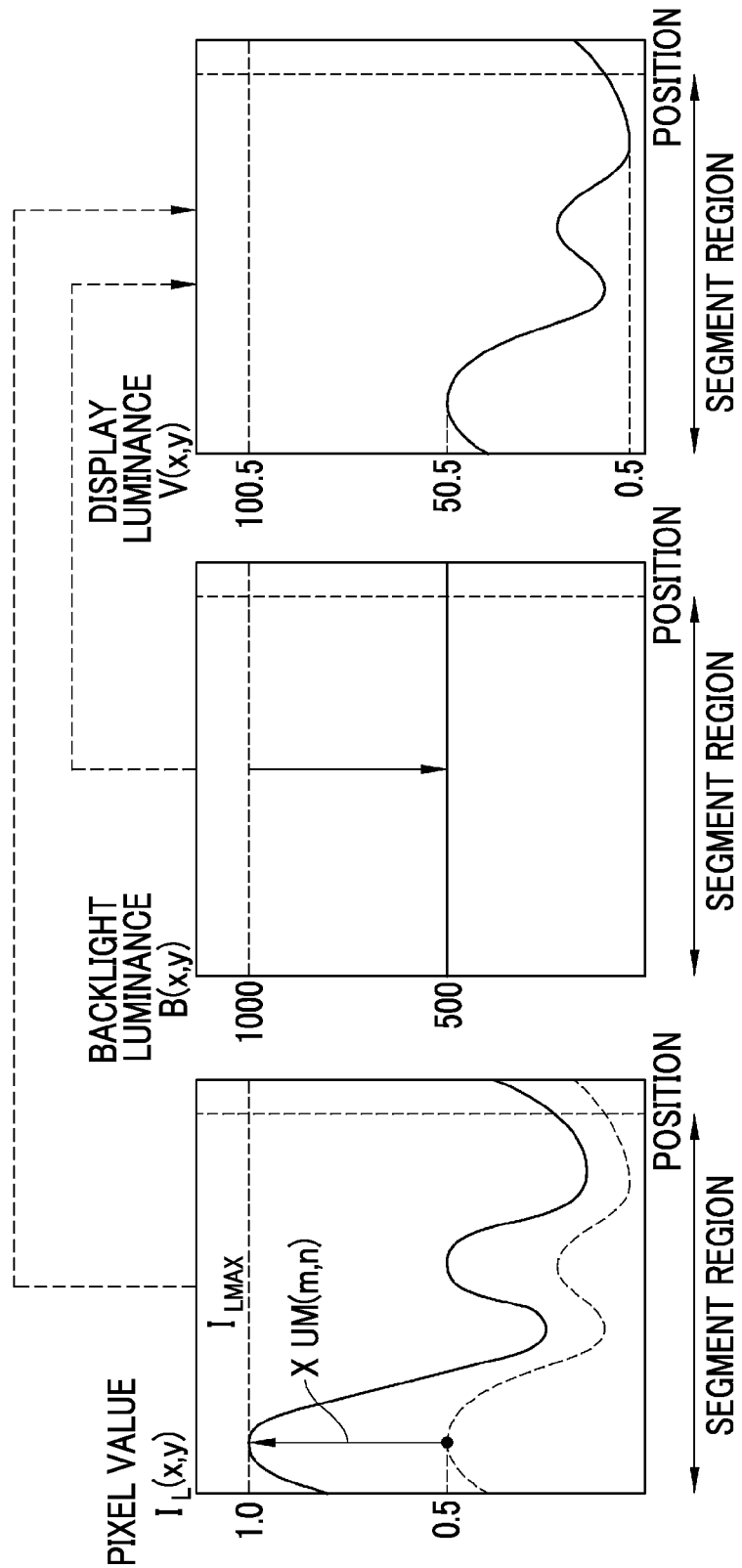
FIG. 7 is an explanatory diagram for explaining a display luminance in a case where UM correction is performed.

As shown in FIG. 7, in a case where $UM(m, n) > 1$, even if the gain of the pixel value of each pixel $q(x, y)$ of the segment region $S(m, n)$ increases by an amount of the $UM(m, n)$, it is possible to increase the transmittance of the liquid crystal panel 15 without causing information loss in gray-level information of a highlighted region of a displayed image caused due to a clip (a peak of the pixel values) of the maximum value. Then, if the backlight luminance $B(x, y)$ of the segment region $S(m, n)$ is further decreased to $1/UM(m, n)$, a total display luminance $V(x, y)$ scarcely changes, and reduction in power consumption can be achieved by an amount of the decrease of the backlight luminance $B(x, y)$. Hereinafter, such control is referred to as a UM correction.

As shown in FIG. 5 in the above description, in a case where the UM correction is not performed, the panel transmittance $P(x, y)$ of the liquid crystal panel 15 is defined by Expression (2) on the basis of the image data $I_L(x, y)$. Here, the UM correction is not performed, and thus it is also not necessary to perform the gray-level correction. As a result, $I_L(x, y) = C_L(x, y)$. Accordingly, the display luminance $V(x, y)$ is represented by the following Expression (4). In addition, FIG. 5 shows, as an example, a case where $B(x, y) = 1000$, $a_P = 0.1$, and $b_P = 0.001$. In this case, an amount of black floating at $I_L(x, y)$ of 0 is 1. Further, in FIG. 5, for the sake of simplicity of the drawing, the above-mentioned values are expressed in one dimension (it is the same for FIG. 7).

$$V(x,y) = (a_P I_L(x,y) + b_P) B(x,y) \quad (4)$$

In contrast, as shown in FIG. 7 in the above description, in the case where the UM correction is performed, the representative value $I_{LPEAK}(m, n)$ of the image data $I_L(x, y)$ of the segment region $S(m, n)$ is, for example, 0.5, and $UM(m, n) = 1/0.5 = 2$. At this time, the display luminance $V(x, y)$ is represented by the following Expression (5) through the UM correction. In the UM correction, the pixel values of the image data $I_L(x, y)$ are set to be twice original values thereof, and the backlight luminance $B(x, y)$ is set to be $1/UM(m, n) = \frac{1}{2}$ times its original value.

$$V(x, y) = (a_P \cdot 2 \cdot I_L(x, y) + b_P) \cdot (B(x, y)/2) \quad (5)$$
$$= (a_P I_L(x, y) + b_P/2) \cdot B(x, y)$$

The amount of black floating at the display luminance $V(x, y)$ represented in Expression (5) mentioned above decreases by a half of that at the display luminance $V(x, y)$ represented in Expression (4) mentioned above in the case where the UM correction is not performed. Therefore, an observer may feel that black floating is less. For example, in the case of the condition shown in FIG. 5 in the above description, the amount of black floating at $I_L(x, y)$ of 0 is minimized to 0.5. In contrast, in a case where the $I_L(x, y)$ is large, an absolute value of the luminance is high, and an observer scarcely feels change in black floating. Specifically, in the examples of FIGS. 5 and 7, an observer scarcely feels a difference between $V(x, y)$ of 51 and $V(x, y)$ of 50.5. Such sensory properties of a human can be explained on the basis of the law of Weber-Fechner or the like.

As a result, by performing the UM correction, an observer may feel as if a display contrast of an image displayed on the liquid crystal display device 10 increases. Further, in order to decrease the backlight luminance $B(x, y)$ by half, power consumption of the liquid crystal display device 10 is also suppressed. By performing such UM correction for each segment region $S(m, n)$, both an increase in display contrast and reduction in power consumption can be achieved.

<Calculation of LED Setting Value Under Ideal Condition and Gray-Level Correction>

On the basis of a concept of the UM correction, it is ideal that the LED setting value calculation section 30 calculates the LED setting value $E(m, n)$ by which the backlight luminance $B(x, y)$ is set as $1/UM(m, n)$ for each segment region $S(m, n)$. Accordingly, if it is assumed that "emitted light of an LED of a certain segment region $S(m, n)$ is not leaked into peripheral segment regions $S(m, n)$ thereof", the LED setting value $E(m, n)$ of each segment region $S(m, n)$ can be represented by the following Expression (6). Thereby, the backlight luminance $B(x, y)$ and the above-mentioned estimated backlight luminance $B_P(x, y)$ can be set to correspond to the ideal conditions represented in the following Expression (7).

$$E(m,n)=E_0/UM(m,n) \tag{6}$$

$$B(x,y)=B_P(x,y)=B_0/UM(m,n) \tag{7}$$

Here, $E_0$ is an LED setting value in the case where the UM correction is not performed, and is the same value for each segment region $S(m, n)$. Further, $B_0$ is a reference backlight luminance. For example, in a case where the LED setting value is $E_0$ for all the segment regions $S(m, n)$, the backlight luminance is uniformly $B_0$. In addition, in Expression (7), the coordinates $(x, y)$ and $(m, n)$ are mixed, but as described above, the coordinates $(x, y)$ mean coordinates of a pixel unit of an image and the liquid crystal panel 15, and the coordinates $(m, n)$ mean coordinates of the segment region $S(m, n)$ of a pixel $q(x, y)$.

The above-mentioned gray-level correction section 33 calculates the image signal $C_L(x, y)$ on the basis of the estimated backlight luminance $B_P(x, y)$, which is obtained by Expression (7) mentioned above, and the following Expression (8). In addition, in a case where $B_0(x, y)=0$, exceptional processing is performed such that 0 division is not performed.

$$C_L(x,y)=B_0 \cdot I_L(x,y)/B_P(x,y)-b_P/a_P \tag{8}$$

If Expression (7) is substituted into Expression (8) mentioned above, the image signal $C_L(x, y)$ is represented by the following Expression (9). Here, the $UM(m, n)$ is a value obtained by Expression (3) mentioned above, and the first term on the right side of Expression (9) is not greater than the maximum value $I_{LMAX}$ (here 1) allowable in the pixel values. Accordingly, the image signal $C_L(x, y)$ is also not clipped since it becomes greater than the maximum value $I_{LMAX}$, and information loss in the gray-level information of the highlighted region caused by the gray-level correction does not occur.

$$C_L(x,y)=I_L(x,y) \cdot UM(m,n)-b_P/a_P \tag{9}$$

By substituting Expression (9) into Expression (2) mentioned above, the panel transmittance $P(x, y)$ is represented by the following Expression (10). Then, by further substituting the panel transmittance $P(x, y)$ into Expression (1) mentioned above, the display luminance $V(x, y)$ is represented by the following Expression (11).

$$P(x,y)=a_P \cdot I_L(x,y) \cdot UM(m,n) \tag{10}$$

$$V(x, y) = a_P \cdot I_L(x, y) \cdot UM(m, n) \cdot B_0/UM(m, n) \tag{11}$$
$$= a_P \cdot I_L(x, y) \cdot B_0$$
$$= a_P \cdot I(x, y)^{2.2} \cdot B_0$$

The display luminance $V(x, y)$ represented by Expression (11) mentioned above is a display luminance which is obtained in a case where the image data $I_L(x, y)$ is input to the liquid crystal panel 15 having no black floating and the backlight luminance $B(x, y)$ is set as the uniform luminance $B_0$. That is, by performing the above-mentioned UM correction, black floating is reduced without information loss of the gray-level information of the highlighted region caused by a clip of the above-mentioned maximum value. As a result, it is possible to increase the display contrast. At the same time, the backlight luminance $B(x, y)$ is reduced by an amount of $1/UM(m, n)$ for each segment region $S(m, n)$. Therefore, power consumption is also minimized.

Figure 8:
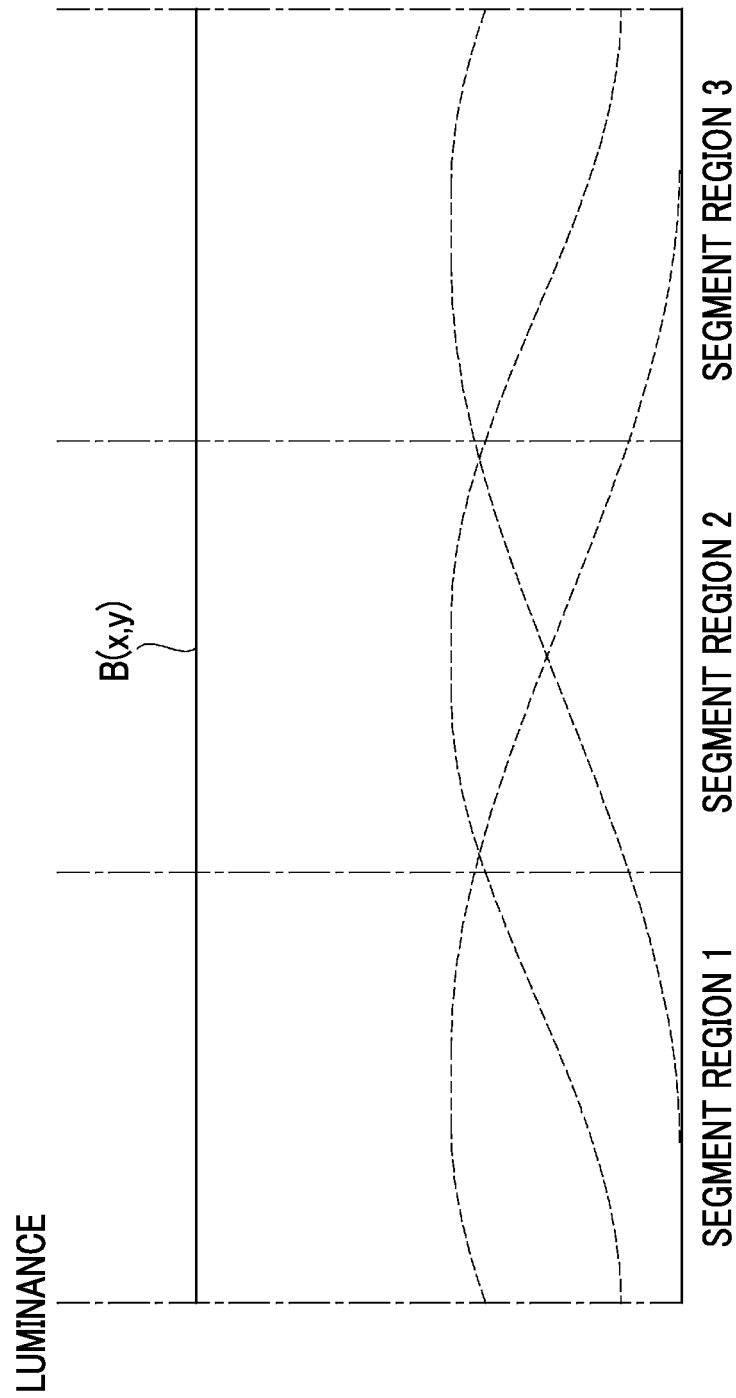
FIG. 8 is an explanatory diagram for explaining leakage of light between the segment regions.

The BLD control can be implemented by the UM correction. However, here, it is generally difficult to implement the assumed structure in which "emitted light of an LED of a certain segment region $S(m, n)$ does not leak into peripheral segment regions $S(m, n)$ thereof". Hence, as indicated by the dotted line in FIG. 8, light is emitted from a single segment region 2 among a segment region 1, the segment region 2, a segment region 3, . . . , and the segment region $S(m, n)$. In this case, the light also leaks into the peripheral segment regions 1 and 3. Accordingly, the backlight luminance $B(x, y)$ and the estimated backlight luminance $B_P(x, y)$ at a certain point of the liquid crystal panel 15 are defined depending on not only the LED setting value $E(m, n)$ of the segment region 2 including the point but also effects of the LED setting values $E(m, n)$ of the peripheral segment regions 1 and 3 and the like. In general, this is represented by the following Expression (12). In addition, the solid line of FIG. 8 indicates a backlight luminance $B(x, y)$ which is obtained by synthesizing the luminances of emitted light of the respective segment regions $S(m, n)$. Further, the dotted line in the drawing indicates light emission distribution of each segment region $S(m, n)$ in a case where the LED setting value $E(m, n)$ is set as $E_0$.

$$B(x,y)=B_P(x,y)=E(x,y)*f(x,y) \tag{12}$$

Figure 9:
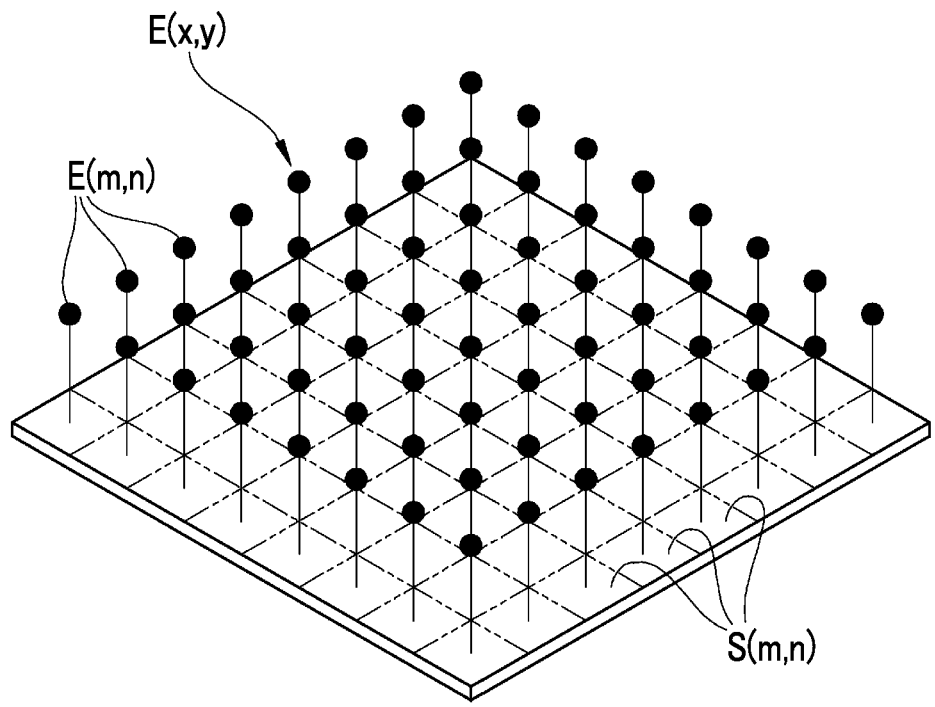
FIG. 9 is an explanatory diagram for explaining an LED setting value function.
Figure 10:
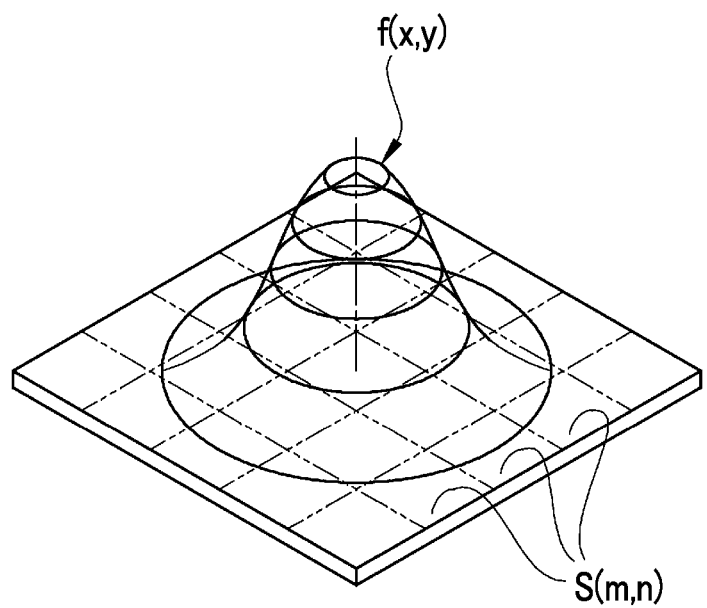
FIG. 10 is an explanatory diagram for explaining a light emission distribution function.

Here, "*" in Expression (12) means a convolution operation. Further, as shown in FIG. 9 and the reference numerals 300 and 301 of FIG. 11, the $E(x, y)$ is an LED setting value function. Through the function, a value of the LED setting value $E(m, n)$, which is set for each segment region $S(m, n)$, at the center of each segment region $S(m, n)$ is obtained, and is set to 0 at all positions other than the center. Furthermore, as shown in FIG. 10 and the reference numeral 302 of FIG.

11, the f(x, y) is a light emission distribution function that indicates light emission distribution characteristics of the single LED 19, and emitted light is dispersed throughout a plurality of segment regions. In addition, in FIG. 11, for the sake of simplicity of the drawing, the above-mentioned values are expressed in one dimension.

Figure 11:
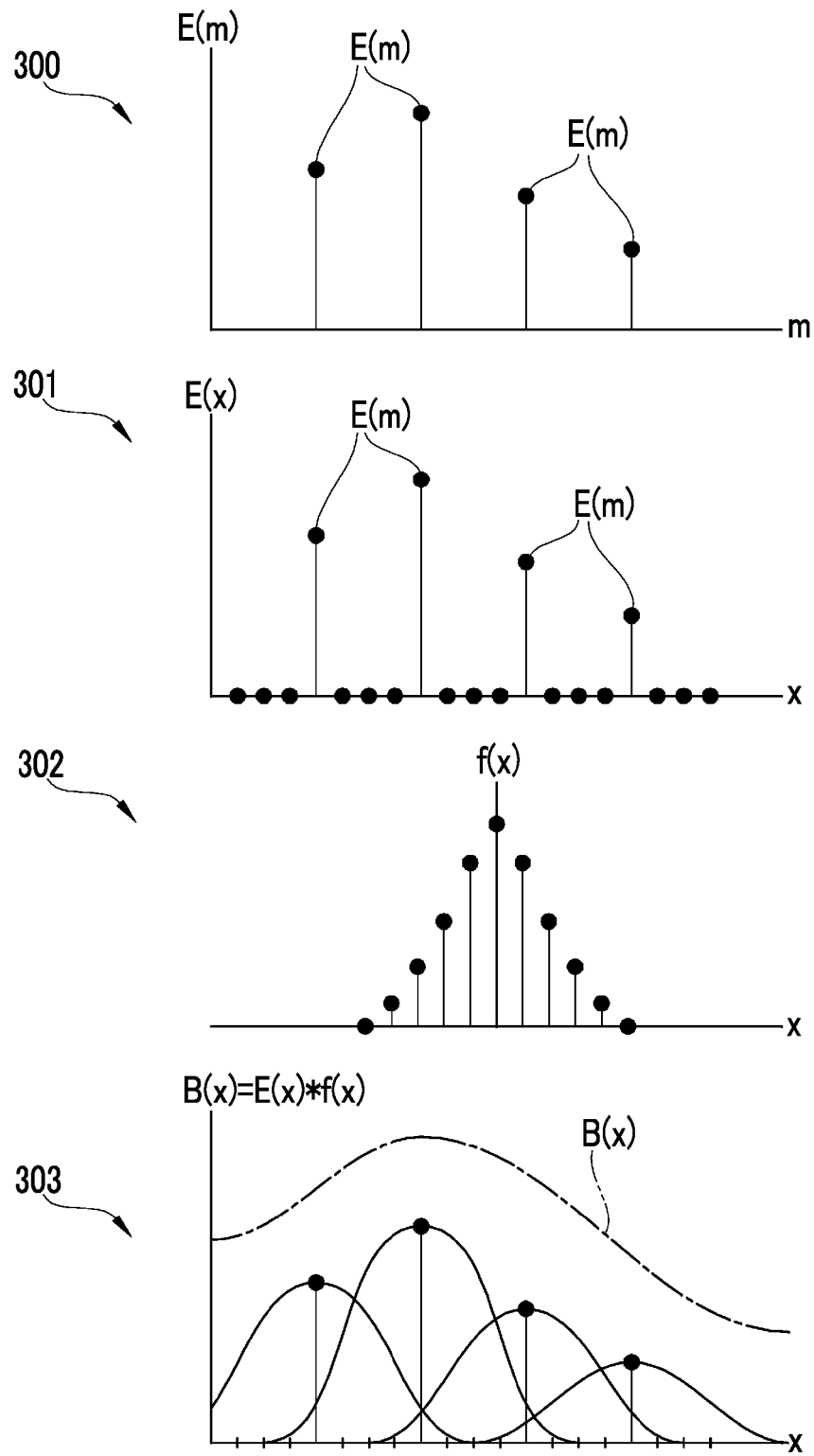
FIG. 11 is an explanatory diagram for explaining processing of convolution operation between the LED setting value function and the light emission distribution function.

As shown in the reference numeral 303 of FIG. 11, the backlight luminance B(x, y) indicated by the chain line in the drawing is defined by the convolution operation between the LED setting value function E(x, y) and the light emission distribution function f(x, y).

At this time, normally, the UM(m, n) is different for each segment region S(m, n), and thus the LED setting value E(m, n) is also different for each segment region S(m, n). Accordingly, in a simple calculation method of the LED setting value E(m, n) as in Expression (6) mentioned above, the backlight luminance B(x, y), which is obtained by synthesizing the luminances of emitted light of the respective segment regions S(m, n), is as indicated by the chain line in the drawing. Thus, the ideal condition as in Expression (7) cannot be satisfied. Therefore, the LED setting value calculation section 30 of the present invention calculates the LED setting value E(m, n) at which the backlight luminance B(x, y) approximate to the ideal condition can be obtained.

<Configuration of LED Setting Value Calculation Section>

Figure 12:
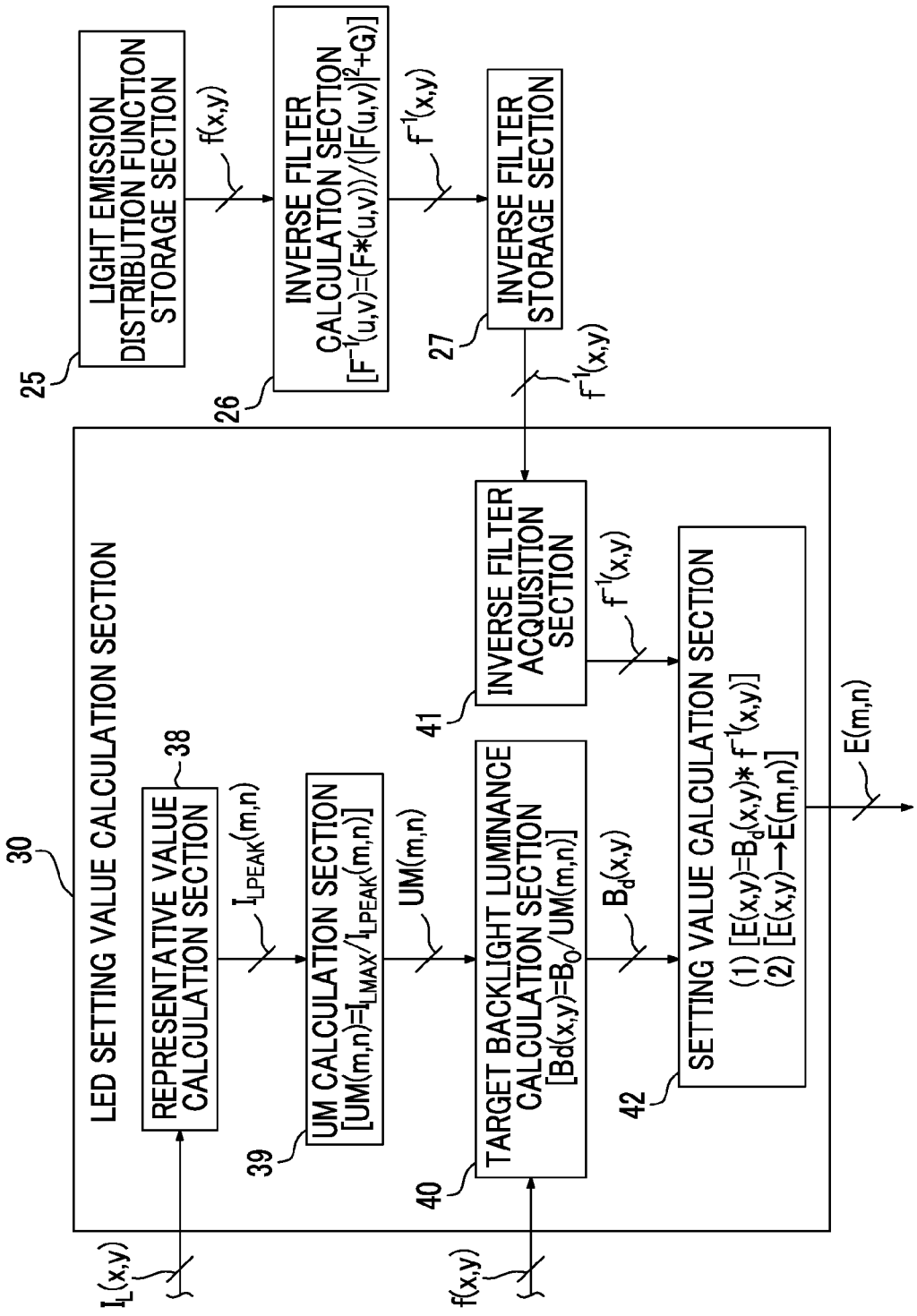
FIG. 12 is a function block diagram of an LED setting value calculation section.

As shown in FIG. 12, in addition to the above-mentioned representative value calculation section 38 and UM calculation section 39, the LED setting value calculation section 30 has a target backlight luminance calculation section (target luminance calculation section) 40, an inverse filter acquisition section 41, and a setting value calculation section 42.

The target backlight luminance calculation section 40 calculates a target backlight luminance $B_d(x, y)$, which is a target luminance (target value) of the display luminance of each segment region S(m, n), by using the following Expression (13) on the basis of the UM(m, n) of each segment region S(m, n) calculated by the UM calculation section 39. Here, Expression (13) is basically the same as Expression (7) mentioned above, and will not be described in detail. However, the target backlight luminance $B_d(x, y)$ is a distribution function having a constant luminance for each segment region S(m, n). The target backlight luminance calculation section 40 outputs a calculation result of the target backlight luminance $B_d(x, y)$ of each segment region S(m, n) to the setting value calculation section 42.

$$B_d(x,y)=B_0/UM(m,n) \qquad (13)$$

The inverse filter acquisition section 41 acquires an inverse filter $f^{-1}(x, y)$ to be described later from the inverse filter storage section 27, and outputs the inverse filter $f^{-1}(x, y)$ to the setting value calculation section 42.

The setting value calculation section 42 calculates the LED setting value E(m, n) of each segment region S(m, n) on the basis of the target backlight luminance $B_d(x, y)$ and the inverse filter $f^{-1}(x, y)$ which are respectively input from the target backlight luminance calculation section 40 and the inverse filter acquisition section 41. Specifically, the setting value calculation section 42 calculates the LED setting value E(m, n) such that the estimated backlight luminance $B_P(x, y)$, which is calculated on the basis of the LED setting value E(m, n) by the above-mentioned backlight luminance estimation section 32, is extremely close to the target backlight luminance $B_d(x, y)$. That is, the setting value calculation section 42 calculates the LED setting value E(m, n) of each segment region S(m, n) so as to minimize a squared error $[(B_d(x, y)-B_P(x, y))^2]$ between the estimated backlight luminance $B_P(x, y)$ and the target backlight luminance $B_d(x, y)$.

Here, the estimated backlight luminance $B_P(x, y)$ can be calculated by Expression (12) mentioned above. Further, as described above, the light emission distribution function f(x, y) is obtained in advance through measurement at the time of design of the liquid crystal display device 10 or the like, and is stored in the light emission distribution function storage section 25. Accordingly, the E(x, y) satisfying the expression $[B_d(x, y)=E(x, y)*f(x, y)]$ in which the $B_P(x, y)$ of Expression (12) is replaced by $B_d(x, y)$, is E(x, y) that minimizes the above-mentioned squared error. Hence, by calculating the inverse filter $f^{-1}(x, y)$ of the light emission distribution function f(x, y) in advance and performing calculation processing of the following Expression (14), it is possible to calculate the E(x, y) that minimizes the above-mentioned squared error.

$$E(x,y)=B_d(x,y)*f(x,y) \qquad (14)$$

Calculation of the inverse filter $f^{-1}(x, y)$ is performed by the above-mentioned inverse filter calculation section 26. The inverse filter calculation section 26 calculates a filter coefficient of the inverse filter $f^{-1}(x, y)$ by using the Wiener filter as a solution for minimizing the above-mentioned squared error. That is, the inverse filter calculation section 26 calculates the Wiener filter as the inverse filter $f^{-1}(x, y)$. Specifically, the inverse filter calculation section 26 calculates the inverse filter $f^{-1}(x, y)$ by performing inverse Fourier transform on $F^{-1}(u, v)$ which is calculated by the following Expression (15). Here, $F^{-1}(u, v)$ is obtained by performing Fourier transform on $f^{-1}(x, y)$, F(u, v) is obtained by performing Fourier transform on f(x, y), $F^{-1}(u, v)$ is a complex conjugate of F(u, v), and G is a parameter. The inverse filter $f^{-1}(x, y)$, which is calculated by the inverse filter calculation section 26, is stored in the inverse filter storage section 27. Thereby, the setting value calculation section 42 is able to acquire the inverse filter $f^{-1}(x, y)$ through the inverse filter acquisition section 41.

$$F^{-1}(u,v)=(F^*(u,v))/(|F(u,v)|^2+G) \qquad (15)$$

The setting value calculation section 42 calculates the LED setting value function E(x, y) for each segment region S(m, n) by performing processing of a convolution operation between the target backlight luminance $B_d(x, y)$ and the inverse filter $f^{-1}(x, y)$ on the basis of Expression (14) mentioned above. Thereby, it is possible to obtain the LED setting value function E(x, y) for obtaining a backlight property approximate to the target backlight luminance $B_d(x, y)$.

Subsequently, the setting value calculation section 42 converts the LED setting value function E(x, y) into the LED setting value E(m, n) for each segment region S(m, n). In addition, the conversion from "E(x, y)" into "E(m, n)" uses, for example, a method of calculating an average value of the LED setting value function E(x, y) for each segment region S(m, n) or the like. Through the processing performed hitherto, calculation of the LED setting value E(m, n) performed by the setting value calculation section 42 is completed. The LED setting value E(m, n) is output to each of the backlight control section 31 and the backlight luminance estimation section 32.

[Effect of Liquid Crystal Display Device of First Embodiment]

Figure 13:
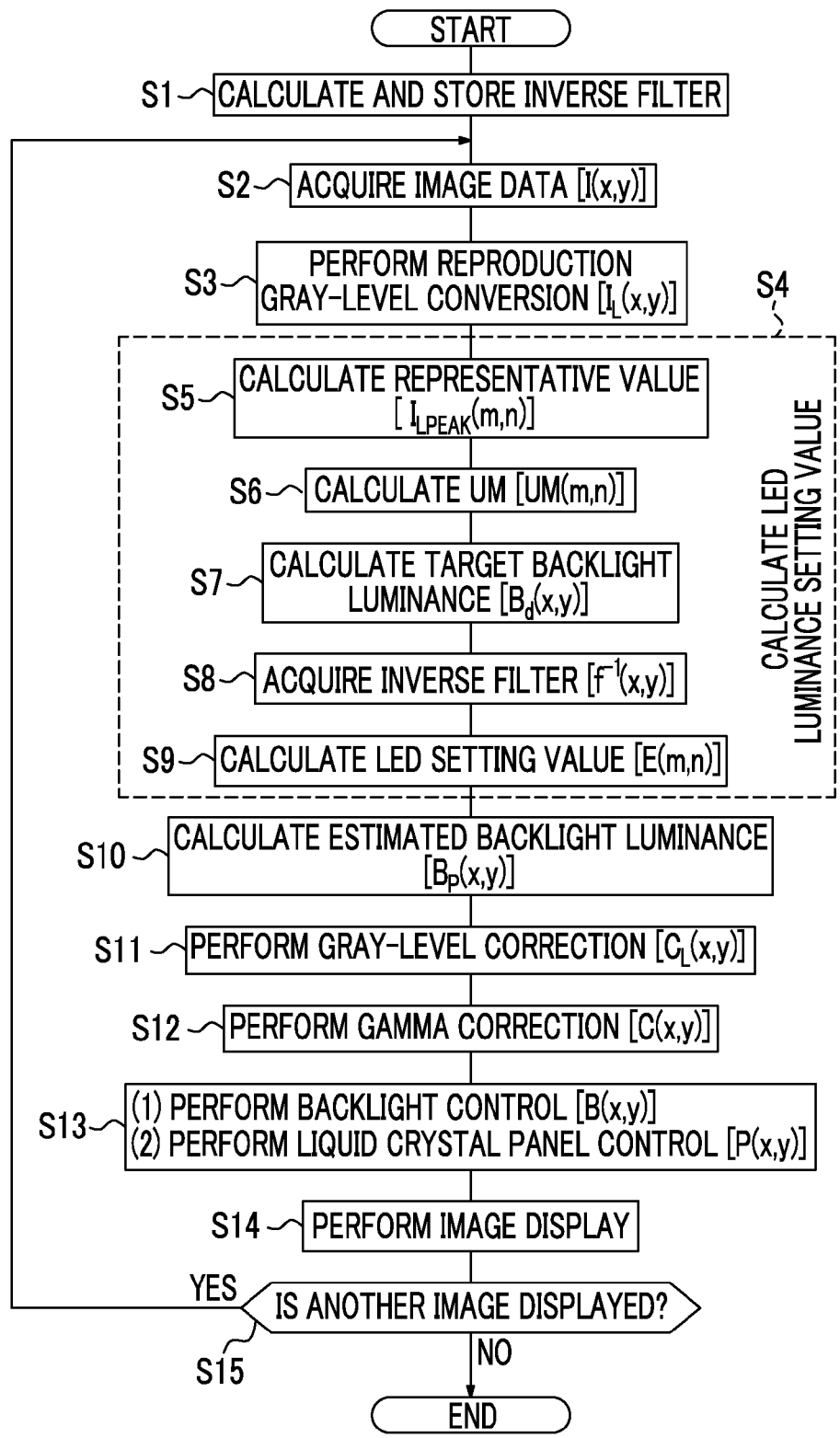
FIG. 13 is a flowchart illustrating flow of image display processing of the liquid crystal display device.

Next, an effect of the liquid crystal display device 10 of the configuration will be described with reference to FIG. 13. The inverse filter calculation section 26 calculates, in advance, the inverse filter $f^{-1}(x, y)$ of the light emission distribution function f(x, y) within the light emission distribution function storage section 25 by using the Wiener filter (refer to Expression (15)), and stores the inverse filter $f^{-1}(x, y)$ in the inverse filter storage section 27 (step S1).

If the liquid crystal display device 10 and the digital camera 12 are connected, the image data acquisition section 21 acquires the image data I(x, y) from the digital camera 12, and outputs the image data I(x, y) to the linear luminance conversion section 22 (step S2, an image data acquisition step). The linear luminance conversion section 22 generates the image data $I_L(x, y)$ by performing the linear luminance conversion processing on the image data I(x, y), and outputs the image data $I_L(x, y)$ to each of the LED setting value calculation section 30 and the gray-level correction section 33 (step S3).

The LED setting value calculation section 30 receives an input of the image data $I_L(x, y)$ from the linear luminance conversion section 22, and starts calculating the LED setting value E(m, n) (step S4).

First, the representative value calculation section 38 calculates the representative value $I_{LPEAK}(m, n)$ for each segment region S(m, n) from the image data $I_L(x, y)$ which is input from the linear luminance conversion section 22, and outputs the calculation result of each representative value $I_{LPEAK}(m, n)$ to the UM calculation section 39 (step S5). Subsequently, the UM calculation section 39 calculates the UM(m, n) of each segment region S(m, n) by using Expression (3) mentioned above on the basis of the representative value $I_{LPEAK}(m, n)$ which is input from the representative value calculation section 38, and outputs the calculation result of the UM(m, n) to the target backlight luminance calculation section 40 (step S6).

The target backlight luminance calculation section 40 calculates the target backlight luminance $B_d(x, y)$ for each segment region S(m, n) by using Expression (13) mentioned above on the basis of the UM(m, n) which is input from the UM calculation section 39 (step S7, a target luminance calculation step). Then, the target backlight luminance calculation section 40 outputs the calculation result of the target backlight luminance $B_d(x, y)$ to the setting value calculation section 42.

Further, the inverse filter acquisition section 41 acquires an inverse filter $f^{-1}(x, y)$ from the inverse filter storage section 27, and outputs the inverse filter $f^{-1}(x, y)$ to the setting value calculation section 42 (step S8, an inverse filter acquisition step).

The setting value calculation section 42 substitutes the target backlight luminance $B_d(x, y)$ and the inverse filter $f^{-1}(x, y)$, which are respectively input from the target backlight luminance calculation section 40 and the inverse filter acquisition section 41, into Expression (14) mentioned above, thereby performing the convolution operation processing. Thereby, the LED setting value function E(x, y) of each segment region S(m, n) is calculated.

Subsequently, the setting value calculation section 42 converts the LED setting value function E(x, y) into the LED setting value E(m, n) for each segment region S(m, n). Thereby, the LED setting value function E(m, n) of each segment region S(m, n) is calculated (step S9, a setting value calculation step). Then, the setting value calculation section 42 outputs the calculation result of the LED setting value E(m, n) to each of the backlight luminance estimation section 32 and the backlight control section 31.

The backlight luminance estimation section 32 calculates the estimated backlight luminance $B_P(x, y)$ of each segment region S(m, n) by using Expression (12) mentioned above on the basis of the LED setting value E(m, n) which is input from the setting value calculation section 42 (step S10). Then, the backlight luminance estimation section 32 outputs the calculation result of the estimated backlight luminance $B_P(x, y)$ to the gray-level correction section 33.

The gray-level correction section 33 performs the gray-level correction processing on the image data $I_L(x, y)$, which is input from the linear luminance conversion section 22, by using Expression (8) mentioned above, on the basis of the estimated backlight luminance $B_P(x, y)$ which is input from the backlight luminance estimation section 32. Thereby, the image signal $C_L(x, y)$ subjected to the gray-level correction processing is calculated for each segment region S(m, n) (step S11). Then, the gray-level correction section 33 outputs the image signal $C_L(x, y)$ to the gamma correction section 34.

The gamma correction section 34 generates the image signal C(x, y) subjected to the gamma correction by performing the gamma correction processing on the image signal $C_L(x, y)$ of each segment region S(m, n) which is input from the gray-level correction section 33 (step S12). Then, the gamma correction section 34 outputs the image signal C(x, y) to the liquid crystal panel control section 35.

The liquid crystal panel control section 35 controls the transmittance of each pixel q(x, y) of the liquid crystal panel 15 on the basis of the image signal C(x, y), and the backlight control section 31 controls light emission of the backlight 16 (each LED 19) on the basis of the LED setting value E(m, n) (step S13, a light source control step). Thereby, an image based on the image data I(x, y) is displayed on the display section 10a (step S14).

Figure 14:
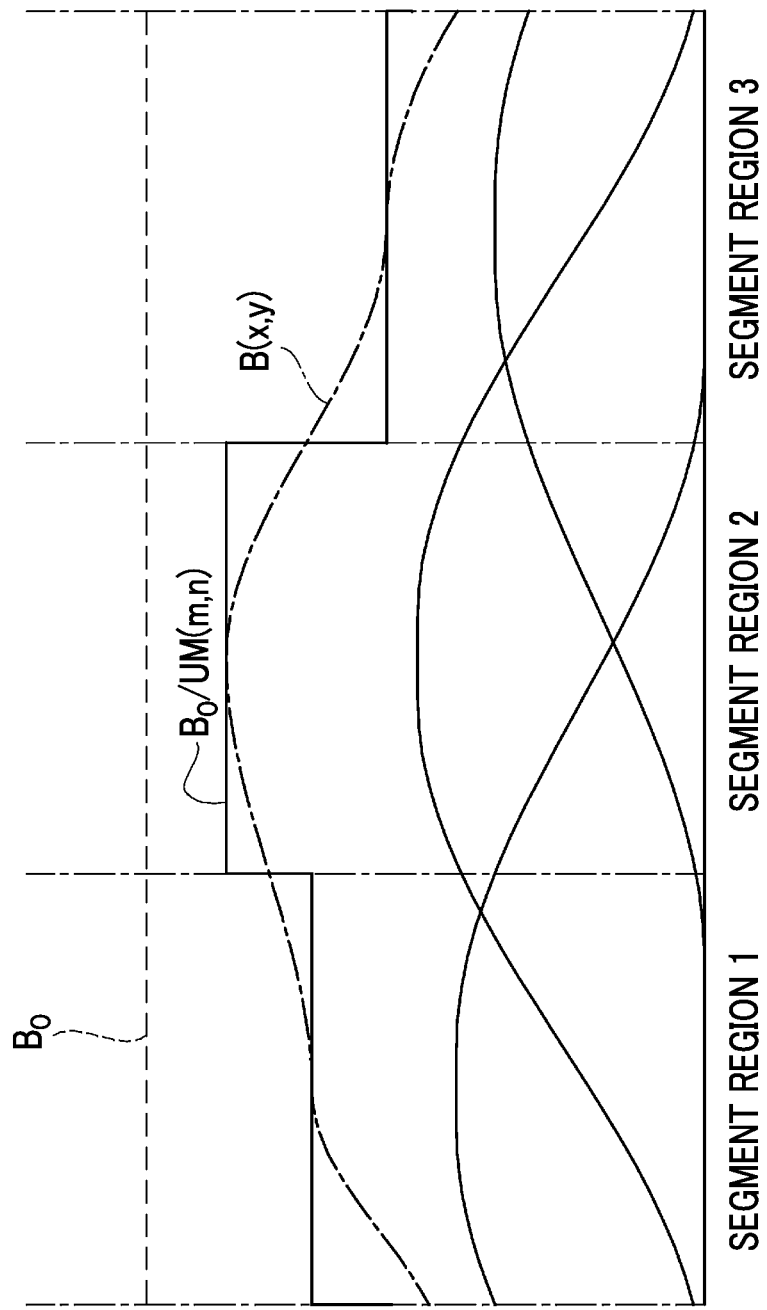
FIG. 14 is an explanatory diagram for explaining a backlight luminance in a case where the LED setting value is calculated in consideration of leakage of light into peripheral segment regions.

As shown in FIG. 14, in the present invention, the LED setting value E(m, n) is calculated in consideration (with reference to FIGS. 8 to 11) of leakage of the light into the peripheral segment regions S(m, n). Therefore, the backlight luminance B(x, y) indicates a property approximate to the target backlight luminance $B_d(x, y)$. In addition, a curve of the solid line of FIG. 14 indicates light emission distribution of each segment region S(m, n) in a case where the LED setting value E(m, n) is set (it is the same for that of FIG. 15).

Figure 15:
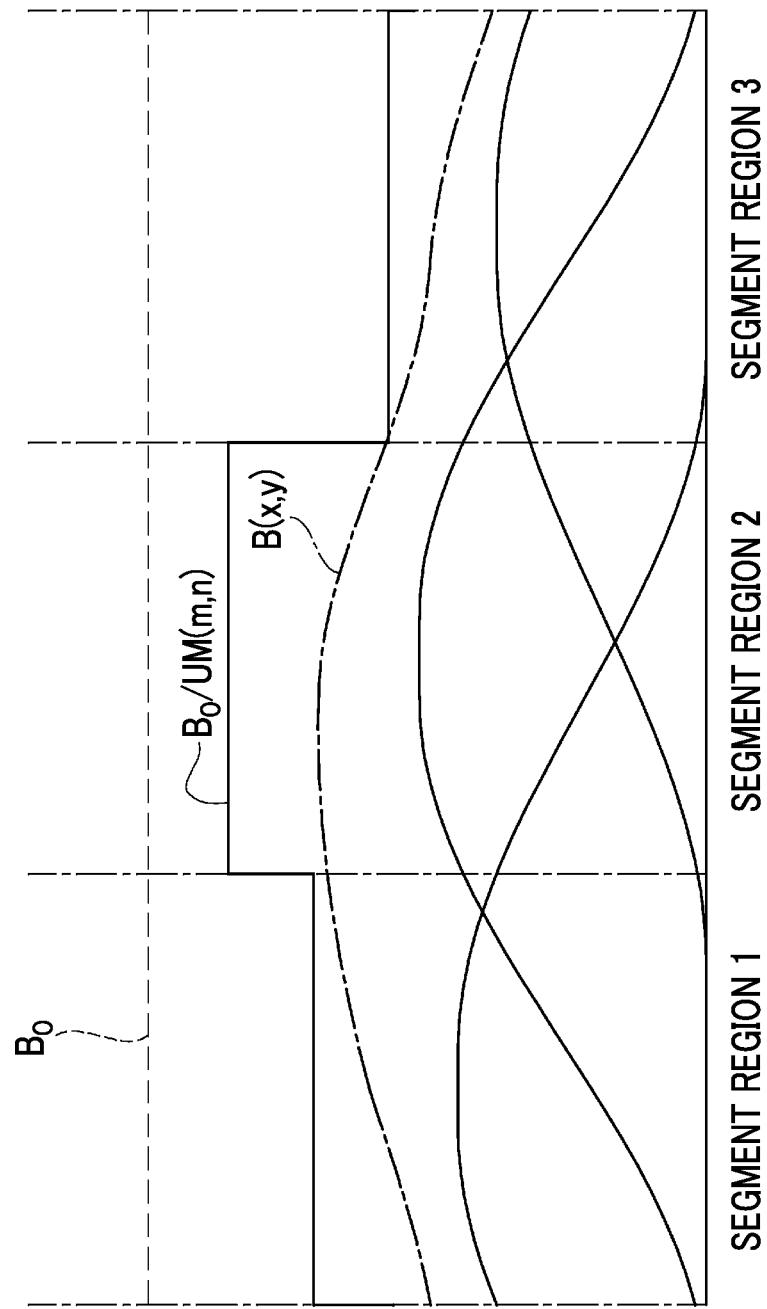
FIG. 15 is an explanatory diagram for explaining a backlight luminance in a comparative example where the LED setting value is calculated without considering leakage of light into peripheral segment regions.

In contrast, in FIG. 15 illustrating a comparative example, in a case where the LED setting value E(m, n) is calculated under the ideal condition without consideration of leakage of the light into the peripheral segment regions S(m, n), the backlight luminance B(x, y) does not satisfy the ideal condition represented by Expression (7) mentioned above. Specifically, the leakage of the light is not considered, and thus the backlight luminance B(x, y) is more likely to be less than the ideal condition. In such a situation, in a case where the gray-level correction is performed through Expression (8) mentioned above by using the estimated backlight luminance $B_P(x, y)$, the image signal $C_L(x, y)$ is greater than 1. Even when the image signal $C_L(x, y)$ is greater than 1, the panel transmittance P(x, y) defined by Expression (2) mentioned above cannot be greater than the maximum transmittance of the liquid crystal panel 15, and thus the image signal $C_L(x, y)$ is clipped at the maximum value of 1. As a result, there is a problem of deterioration in image quality in which the clip causes loss in the gray-level information in the highlighted region of the displayed image.

As compared with such a comparative example, in the present invention, by calculating the LED setting value E(m, n) in consideration of the leakage of the light into the peripheral segment regions S(m, n), it is possible to extremely minimize loss in gray-level information in the highlighted region.

Returning to FIG. 13, in case where image display based on the different image data I(x, y) is performed, the above-mentioned processing from step S2 to step S14 is repeatedly executed (YES in step S15).

<Function Effect of Liquid Crystal Display Device of First Embodiment>

As described above, in the present invention, the inverse filter $f^{-1}(x, y)$ is calculated using the Wiener filter, and the convolution operation processing represented by Expression (14) mentioned above is performed using the inverse filter $f^{-1}(x, y)$. Thereby, the LED setting value E(m, n), in which the leakage of light is considered, is calculated. As a result, contrary to a method of solving a simultaneous equation as described in JP2007-34251A mentioned above, it is possible to calculate the LED setting value E(m, n) in real time.

[Liquid Crystal Display Device of Second Embodiment]

Next, a liquid crystal display device of a second embodiment of the present invention will be described. In the liquid crystal display device 10 of the first embodiment, the Wiener filter is directly used as the inverse filter $f^{-1}(x, y)$. However, in this case, there is a concern about occurrence of disturbance in backlight luminance distribution.

Figure 16:
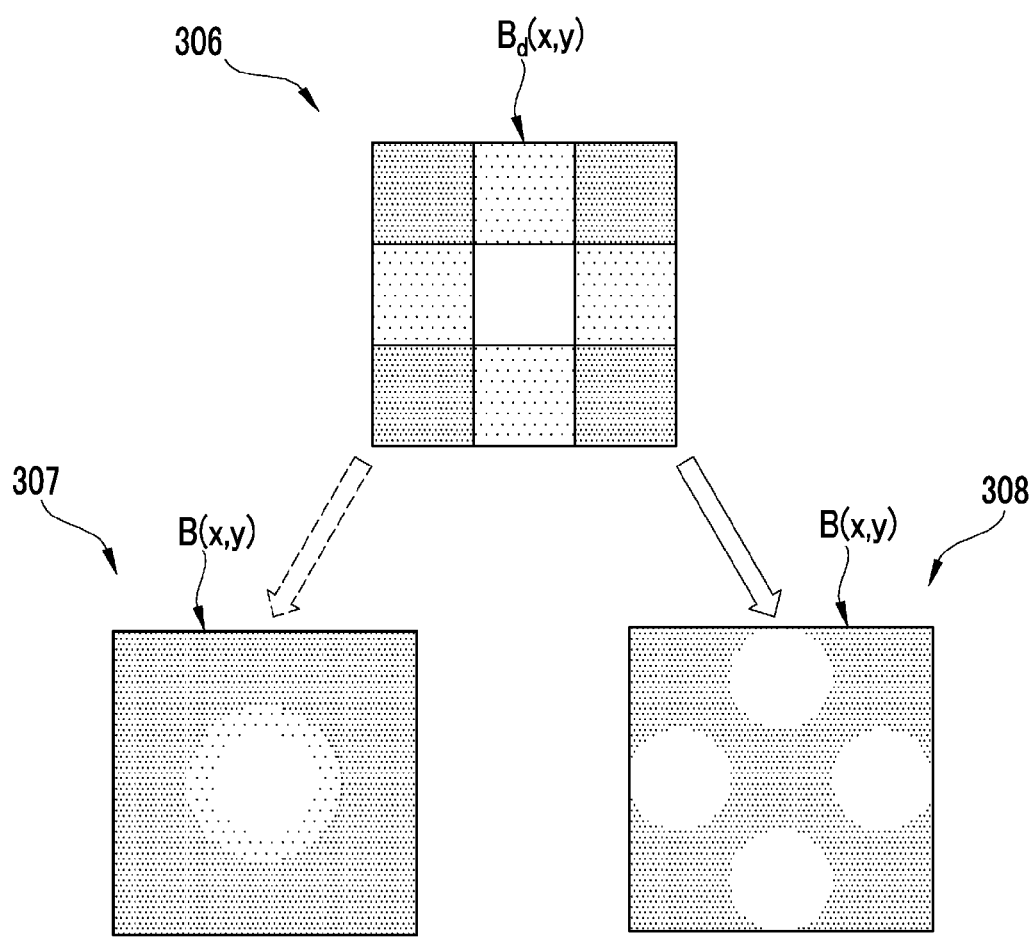
FIG. 16 is an explanatory diagram for explaining disturbance in luminance distribution of the backlight luminance in a case of using a Wiener filter as an inverse filter as it is.

For example, as shown in the reference numeral 306 of FIG. 16, regarding luminance distribution of the target backlight luminance $B_d(x, y)$, of which the center is bright, it is ideal that it is possible to obtain luminance distribution of such a backlight luminance B(x, y) as indicated by the reference numeral 307. However, in a case where the LED setting value E(m, n) is calculated on the basis of the inverse filter $f^{-1}(x, y)$ which is obtained by directly obtaining a filter coefficient from the Wiener filter, as indicated by the reference numeral 308, luminance distribution of the backlight luminance B(x, y), of which the center is dark contrary, may be obtained.

Figure 17:
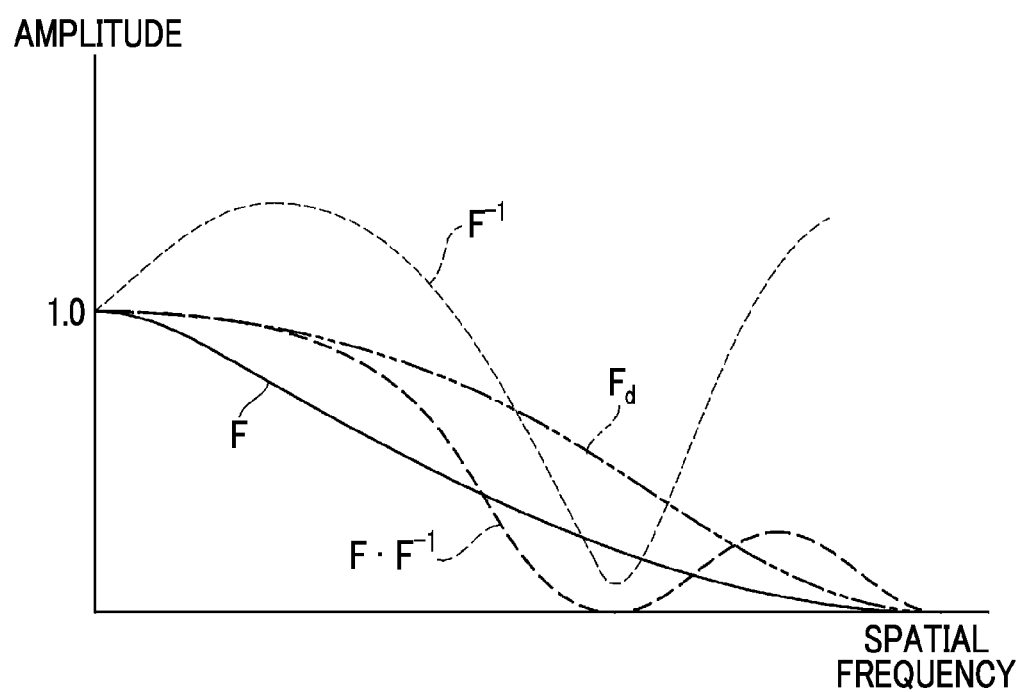
FIG. 17 is an explanatory diagram for explaining a reason of the disturbance in luminance distribution of the backlight luminance shown in FIG. 16.

The reason why such a phenomenon occurs will be described with reference to FIG. 17. The Wiener filter [inverse filter $f^{-1}(x, y)$] is calculated through Expression (15). However, the respective frequency amplitude properties F and $F^{-1}$ of the light emission distribution function f(x, y) and the Wiener filter are indicated by, for example, the solid line and the dotted line (thin line) of the drawing. Further, regarding the luminance property of the backlight luminance B(x, y) (hereinafter referred to as backlight luminance property) which is finally obtained, as represented by Expression (12) mentioned above, the backlight luminance B(x, y) is represented as a convolution between the light emission distribution function f(x, y) and the inverse filter $f^{-1}(x, y)$. Therefore, in terms of frequency characteristics, the backlight luminance B(x, y) is a product of $F \cdot F^{-1}$ between F and $F^{-1}$, and is indicated by the dotted line (heavy line) in the drawing.

Through the effect of the Wiener filter, the backlight luminance property $F \cdot F^{-1}$ is close to the luminance property (hereinafter referred to as target backlight luminance property) $F_d$ of the target backlight luminance $B_d(x, y)$ indicated by the chain double-dashed line in the drawing. Then, making the backlight luminance property $F \cdot F^{-1}$ approximate to the target backlight luminance property $F_d$ with particularly low-frequency waves is effective in minimizing the error between the target backlight luminance $B_d(x, y)$ and the backlight luminance B(x, y).

However, in terms of the light emission distribution function f(x, y), generally, an amplitude on a high-frequency side is small. Accordingly, characteristics of the Wiener filter obtained on the high-frequency side become unstable, and tend to have excessively highlighting characteristics or attenuation characteristics. As a result, aliasing components have effects on the backlight luminance property which is obtained after the inverse filter processing, whereby disturbance in luminance distribution indicated by the reference numeral 308 of FIG. 16 occurs.

Figure 18:
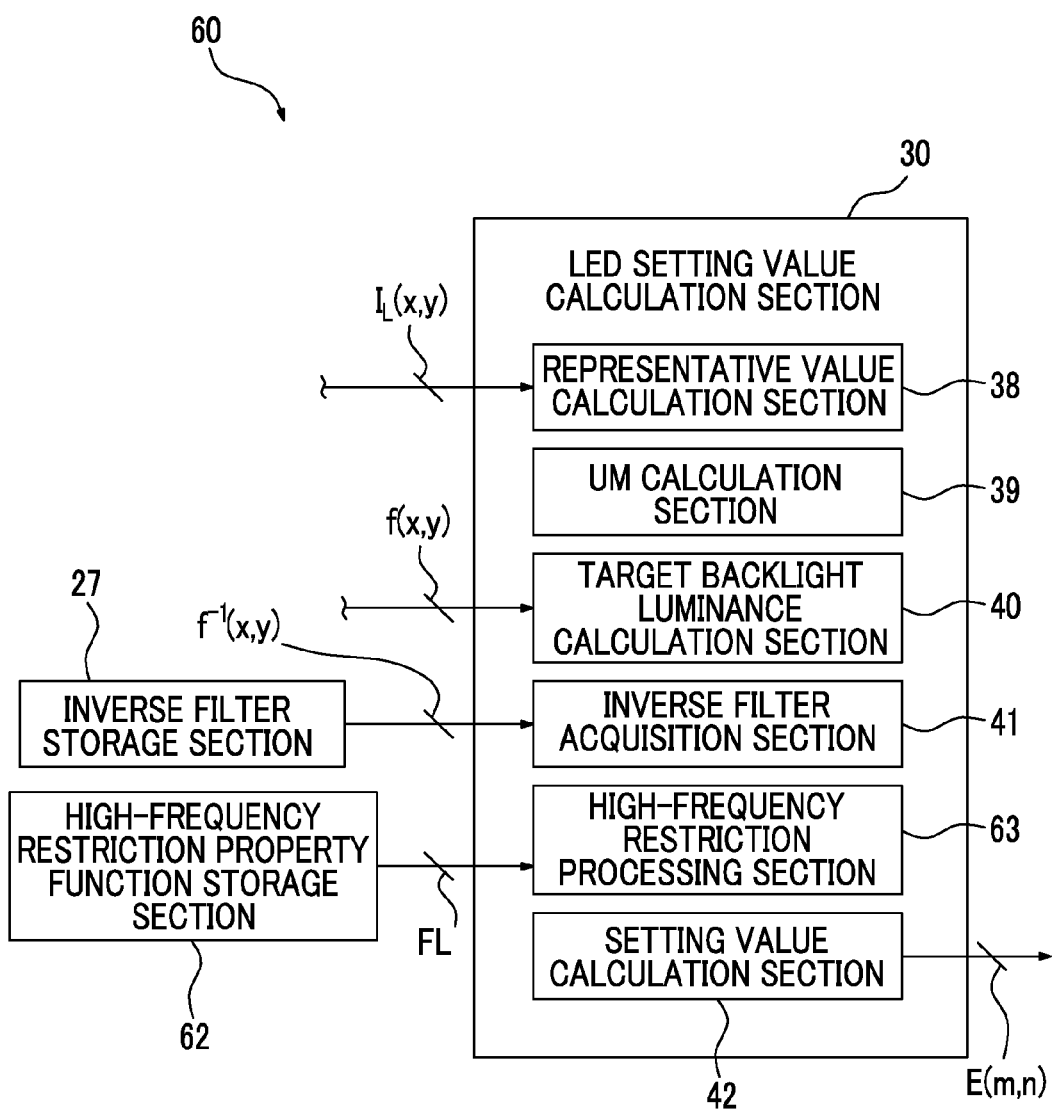
FIG. 18 is a block diagram illustrating an electrical configuration of a liquid crystal display device of a second embodiment.

Accordingly, as shown in FIG. 18, in the liquid crystal display device 60 of the second embodiment of the present invention, high-frequency restriction processing, which restricts the amplitude on a higher-frequency side than the specific spatial frequency, is performed on the inverse filter $f^{-1}(x, y)$. The "specific spatial frequency" described herein is a lower limit of a high-frequency region on which the error between the target backlight luminance $B_d(x, y)$ and the backlight luminance B(x, y) have a less effect. For example, as shown in FIG. 17, the inverse filter $f^{-1}(x, y)$ may have a frequency amplitude property in which an amplitude gradually decreases and then gradually increases in accordance with an increase in the spatial frequency. In this case, a spatial frequency, at which the amplitude changes from a decrease to an increase, is set as the "specific spatial frequency", and the amplitude on the higher-frequency side than the spatial frequency is restricted. It should be noted that the "specific spatial frequency" is a value which is determined through an experiment, a simulation, or the like.

The liquid crystal display device 60 of the second embodiment includes a high-frequency restriction property function storage section 62 that stores a high-frequency restriction property function FL, and has basically the same configuration as the liquid crystal display device 10 of the first embodiment except that a high-frequency restriction processing section 63 is provided in the LED setting value calculation section 30. Hence, the components having the same functions and configurations as the first embodiment are represented by the same reference numerals and signs, and a description thereof will be omitted.

Figure 19:
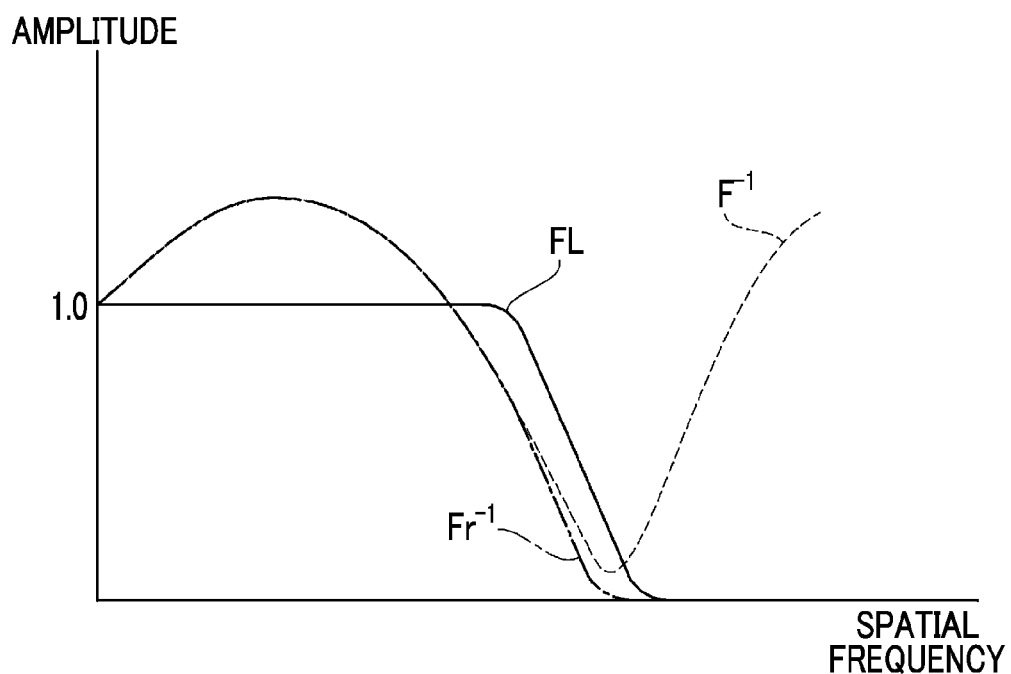
FIG. 19 is an explanatory diagram for explaining a high-frequency restriction property function.

As shown in FIG. 19, the high-frequency restriction property function FL is multiplied by $F^{-1}$ [inverse filter $f^{-1}(x, y)$] on the frequency space, and has a high-frequency restriction property that restricts the amplitude on the higher-frequency side than the "specific spatial frequency" of the inverse filter $f^{-1}(x, y)$. Accordingly, by multiplying the high-frequency restriction property function FL by $F^{-1}$, it is possible to obtain the inverse filter $f^{-1}(x, y)$ subjected to the high-frequency restriction processing. In addition, the reference numeral "$Fr^{-1}$" in the drawing indicates a frequency amplitude property of the inverse filter $f^{-1}(x, y)$ subjected to the high-frequency restriction processing.

Returning to FIG. 18, the high-frequency restriction processing section 63 reads the high-frequency restriction property function FL from the high-frequency restriction property function storage section 62, and performs processing of multiplying the high-frequency restriction property function FL by the inverse filter $f^{-1}(x, y)$ which is input from the inverse filter acquisition section 41. Specifically, after the inverse filter $f^{-1}(x, y)$ is subjected to Fourier transform once and converted into a function on the frequency space, the function is multiplied by the high-frequency restriction property function FL, and the multiplication result is subjected to inverse Fourier transform. Thereby, it is possible to obtain the inverse filter $f^{-1}(x, y)$ having the frequency amplitude property $Fr^{-1}$.

The setting value calculation section 42 calculates the LED setting value function E(x, y) by substituting the target backlight luminance $B_d(x, y)$ and the inverse filter $f^{-1}(x, y)$, which is subjected to the high-frequency restriction processing, into Expression (14) mentioned above, and thereafter converts the LED setting value function E(x, y) into the LED setting value E(m, n).

<Effect of Liquid Crystal Display Device of Second Embodiment>

Figure 20:
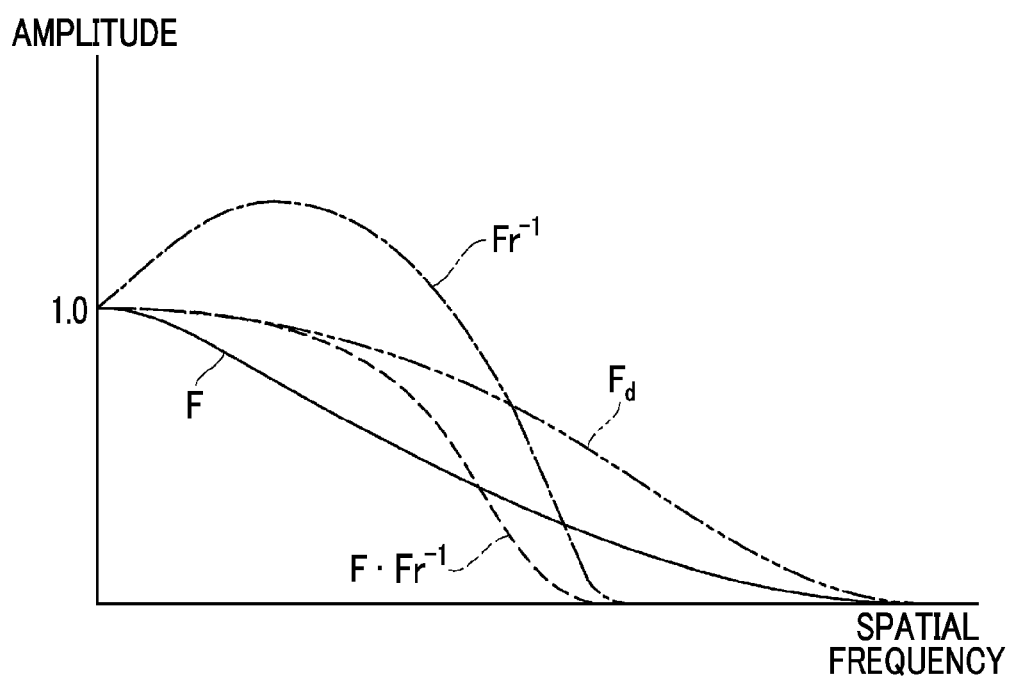
FIG. 20 is an explanatory diagram for explaining high-frequency restriction processing using the high-frequency restriction property function.

As shown in FIG. 20, the backlight luminance property $F \cdot Fr^{-1}$ obtained by performing the high-frequency restriction processing on the inverse filter $f^{-1}(x, y)$ is approximate to the target backlight luminance property $F_d$ on the low-frequency side without disadvantageous aliasing components on the high-frequency side. Thereby, it is possible to effectively minimize information loss of the gray-level information of the highlighted region without disturbance in backlight luminance property $F \cdot Fr^{-1}$.

<Another Example of Second Embodiment>

Figure 21:
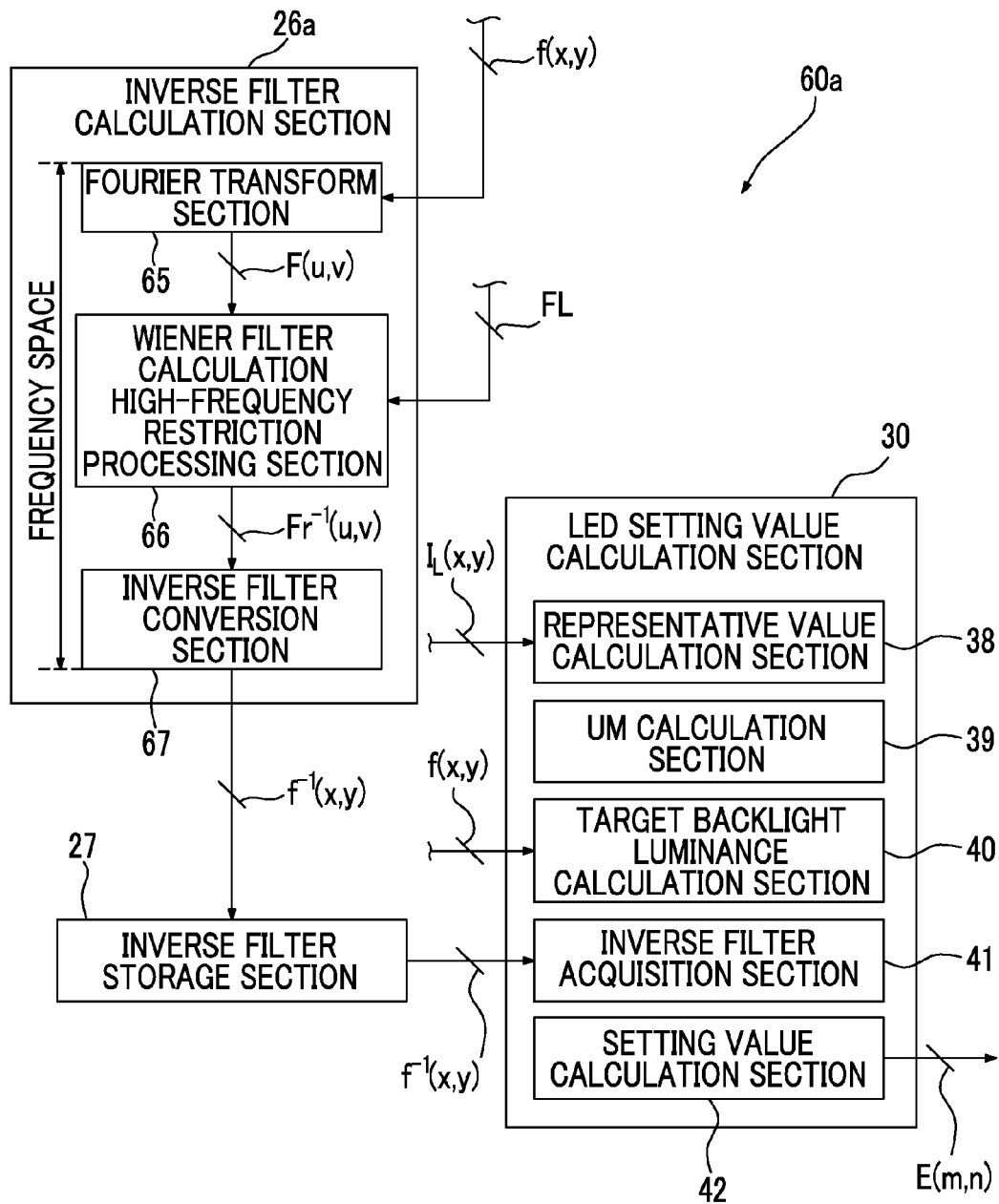
FIG. 21 is a block diagram illustrating an electrical configuration of a liquid crystal display device according to another example of the second embodiment.

Next, a liquid crystal display device 60a of another example of a second embodiment of the present invention will be described with reference to FIG. 21. The liquid crystal display device 60 of the second embodiment performs the high-frequency restriction processing on the inverse filter $f^{-1}(x, y)$ which is acquired by the inverse filter acquisition section 41. However, in the liquid crystal display device 60a, the inverse filter $f^{-1}(x, y)$, which is subjected to the high-frequency restriction processing in advance at the time of calculation (design) of the inverse filter $f^{-1}(x, y)$, is calculated.

The liquid crystal display device 60a has basically the same configuration as the liquid crystal display device 10 of the first embodiment except that it includes an inverse filter calculation section 26a different from the inverse filter calculation section 26 of the first embodiment. Hence, the components having the same functions and configurations as the first embodiment are represented by the same reference numerals and signs, and a description thereof will be omitted.

The inverse filter calculation section 26a includes a Fourier transform section 65, a Wiener filter calculation high-frequency restriction processing section 66, and an inverse filter conversion section 67. Here, the Wiener filter calculation high-frequency restriction processing section 66 functions as the high-frequency restriction processing section of the present invention.

The Fourier transform section 65 calculates F(u, v), which is a function on the frequency space, by performing the Fourier transform processing on the light emission distribution function f(x, y) which is acquired from the above-mentioned light emission distribution function storage section 25, and outputs the calculation result to the Wiener filter calculation high-frequency restriction processing section 66.

The Wiener filter calculation high-frequency restriction processing section 66 first calculates $F^{-1}(u, v)$ through the Wiener filter by substituting the F(u, v), which is acquired from the Fourier transform section 65, into the Expression (15) mentioned above. Subsequently, the Wiener filter calculation high-frequency restriction processing section 66 calculates the $Fr^{-1}(u, v)$, which is subjected to the high-frequency restriction processing, by performing processing of multiplying the $F^{-1}(u, v)$ by the high-frequency restriction property function FL, which is acquired from the high-frequency restriction property function storage section 62 or the like. Then, the Wiener filter calculation high-frequency restriction processing section 66 outputs the calculation result of $Fr^{-1}(u, v)$ to the inverse filter conversion section 67.

The inverse filter conversion section 67 converts the $Fr^{-1}(u, v)$ into a real-space function by performing inverse Fourier transform processing on the $Fr^{-1}(u, v)$ which is input from the Wiener filter calculation high-frequency restriction processing section 66. That is, the inverse filter $f^{-1}(x, y)$ subjected to the high-frequency restriction processing is calculated. Then, the inverse filter conversion section 67 stores the inverse filter $f^{-1}(x, y)$, which is subjected to the high-frequency restriction processing, in the inverse filter storage section 27. Thereby, the inverse filter $f^{-1}(x, y)$, which is subjected to the high-frequency restriction processing, is calculated in advance, and is stored in the inverse filter storage section 27.

The setting value calculation section 42 calculates the LED setting value E(m, n) on the basis of the inverse filter $f^{-1}(x, y)$ which is acquired from the inverse filter storage section 27 by the inverse filter acquisition section 41.

<Effect of Another Example of Second Embodiment>

As described above, in the liquid crystal display device 60a, the LED setting value E(m, n) is calculated on the basis of the "inverse filter $f^{-1}(x, y)$ subjected to the high-frequency restriction processing". Therefore, it is possible to obtain the same effect as the effect described in the second embodiment.

In the liquid crystal display device 60 of the above-mentioned second embodiment, the high-frequency restriction processing is performed after the calculation of the inverse filter $f^{-1}(x, y)$. Accordingly, after the inverse filter $f^{-1}(x, y)$ as a real-space function is converted into a function on the frequency space, it is necessary for the function to be multiplied by the high-frequency restriction property function FL. In contrast, in the liquid crystal display device 60a, a stage before the calculation of the inverse filter $f^{-1}(x, y)$, that is, F(u, v) as the function on the frequency space is multiplied by the high-frequency restriction property function FL. Accordingly, in a manner similar to that of the second embodiment, it is possible to omit time and effort for converting the inverse filter $f^{-1}(x, y)$ into the function on the frequency space.

<Others of Second Embodiment>

In the second embodiment and other examples, the inverse filter $f^{-1}(x, y)$ on the frequency space is multiplied by the high-frequency restriction property function FL. However, the high-frequency restriction processing may be implemented by performing digital filter processing having characteristics equivalent to the high-frequency restriction property function FL on the real space. Further, the high-frequency restriction processing may be performed using well-known various methods.

[Liquid Crystal Display Device of Third Embodiment]

Next, a liquid crystal display device of a third embodiment of the present invention will be described. The inverse filter processing using the inverse filter $f^{-1}(x, y)$ of the first embodiment is digital filter processing on the real space. However, the Wiener filter obtained through Expression (15) mentioned above is a filter coefficient on the frequency space. Hence, it is necessary to obtain a filter coefficient of the inverse filter $f^{-1}(x, y)$ on the real space through inverse Fourier transform of the Wiener filter which is obtained through Expression (15). The number of samples of the filter coefficient obtained therein is equal to the number of frequency samples obtained when the Wiener filter is calculated.

Figure 22:
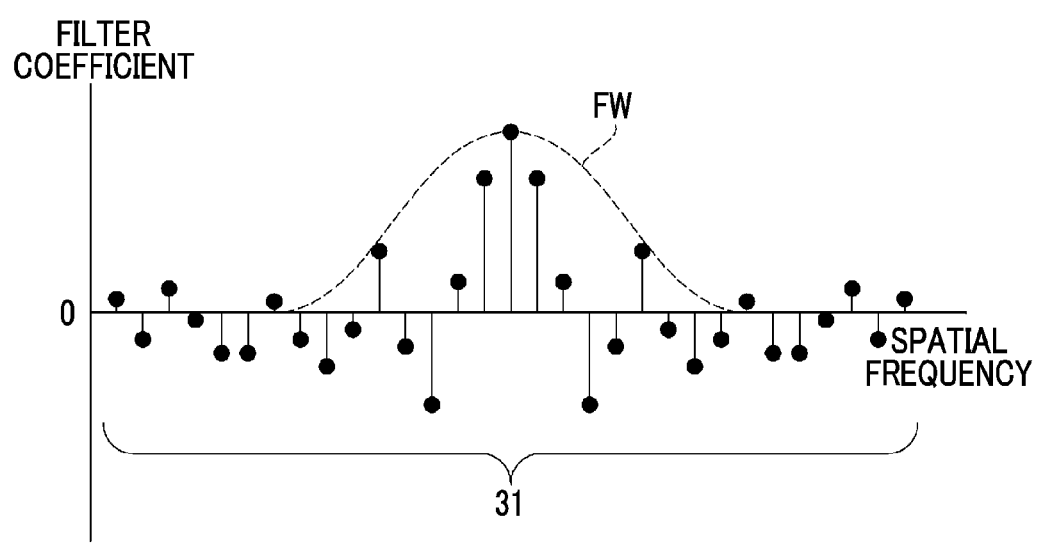
FIG. 22 is an explanatory diagram for explaining the number of filter coefficients of an inverse filter.

FIG. 22 shows an example of the filter coefficient of the inverse filter $f^{-1}(x, y)$ which is obtained through inverse Fourier transform of the Wiener filter in one dimension. In the example of FIG. 22, the number of samples of the filter coefficient is 31. These 31 filter coefficients precisely indicate characteristics of the inverse filter $f^{-1}(x, y)$. However, in order to use all the 31 filter coefficients, 31 filter coefficients in one dimension and 31×31=961 filter coefficients in two dimensions are necessary. Therefore, the circuit size extremely increases. Further, if the number of filter coefficients is large, delay in processing occurs by that amount, and thus there is a concern about occurrence of display delay.

Accordingly, in the liquid crystal display device of the third embodiment, in order to extremely reduce the filter coefficients while holding characteristics of the inverse filter $f^{-1}(x, y)$ as much as possible, limitation using the window function FW is performed.

Figure 23:
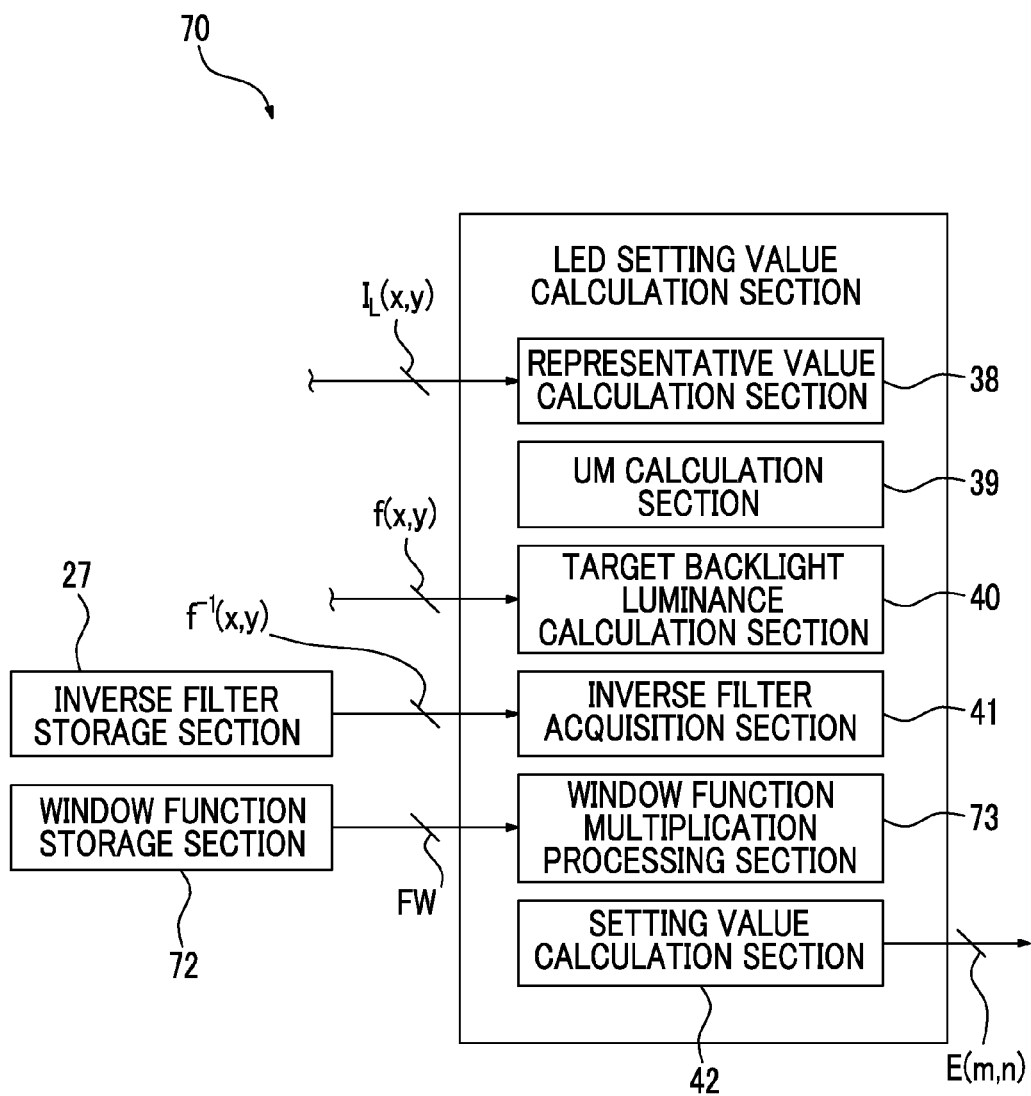
FIG. 23 is a block diagram illustrating an electrical configuration of a liquid crystal display device of a third embodiment.

As shown in FIG. 23, the liquid crystal display device 70 of the third embodiment has basically the same configuration as the liquid crystal display device 10 of the first embodiment except that there is provided a window function storage section 72 that stores the window function FW and a window function multiplication processing section 73 is provided in the LED setting value calculation section 30. Hence, the components having the same functions and configurations as the first embodiment are represented by the same reference numerals and signs, and a description thereof will be omitted.

The window function FW is, as shown in FIG. 22, a function of which a value is 0 other than a finite interval. The range of the finite interval is appropriately determined through an experiment, a simulation, or the like. Further, an upper limit of the window function FW is 1. In addition, as the window function FW, window functions having various characteristics are proposed, and thus a Han window, a Hamming window, a Blackman window, a Kaiser window, and the like are used.

Figure 24:
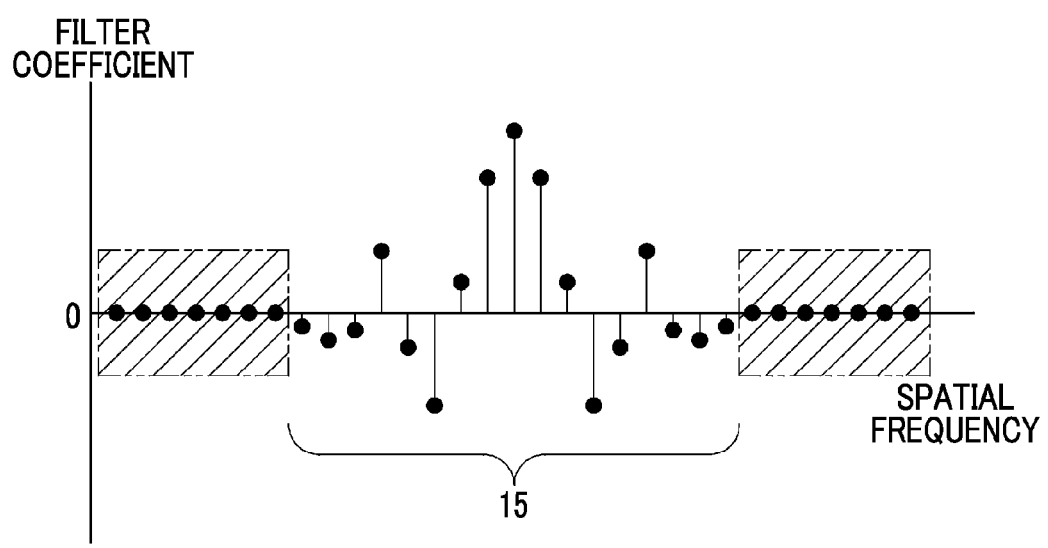
FIG. 24 is an explanatory diagram for explaining processing of restricting the number of filter coefficients using a window function.

As shown in FIG. 24, the window function multiplication processing section 73 reads the window function FW from the window function storage section 72, and the window function FW is multiplied by the filter coefficients of the inverse filter $f^{-1}(x, y)$, which is input from the inverse filter acquisition section 41. Thereby, some of the 31 filter coefficients are 0 at both ends in the drawings. Therefore, the number of filter coefficients is practically, for example, 15 in one dimension, and for example, 15×15=225 in two dimensions. As a result, it is possible to reduce the filter coefficients of the inverse filter $f^{-1}(x, y)$.

<Effect of Liquid Crystal Display Device of Third Embodiment>

As described above, in the liquid crystal display device 70 of the third embodiment, the filter coefficients of the inverse filter $f^{-1}(x, y)$ are multiplied by the window function FW, whereby the number of filter coefficients is limited. As a result, it is possible to minimize an increase in circuit size and delay in processing.

<Another Example of Third Embodiment>

In a manner similar to that of the third embodiment, also in the liquid crystal display device 60 of the second embodiment, the number of filter coefficients may be limited by multiplying the filter coefficients of the inverse filter $f^{-1}(x, y)$ by the window function FW.

[Liquid Crystal Display Device of Fourth Embodiment]

Next, the liquid crystal display device of a fourth embodiment will be described. In the embodiments, it is assumed that the light emission distribution functions $f(x, y)$ of the respective segment regions S(m, n) are the same. However, in accordance with the structure of the backlight 16, the light emission distribution functions $f(x, y)$ of some segment regions S(m, n) may not be the same.

For example, as indicated by the reference numerals 310 and 311 of FIG. 25, in a case where there are variations caused by characteristics of the LED 19, the light emission distribution function $f(x, y)$ is a function which is different in a distribution method. Further, in the segment regions S(m, n) positioned on the periphery of the display screen, due to reflection characteristics of a screen area, the light emission distribution function $f(x, y)$ having rotationally asymmetric characteristics as indicated by the reference numeral 312 may be obtained. Hence, it is preferable to use an optimal inverse filter $f^{-1}(x, y)$ used in the calculation of the LED setting value E(m, n) for each segment region S(m, n).

Figure 26:
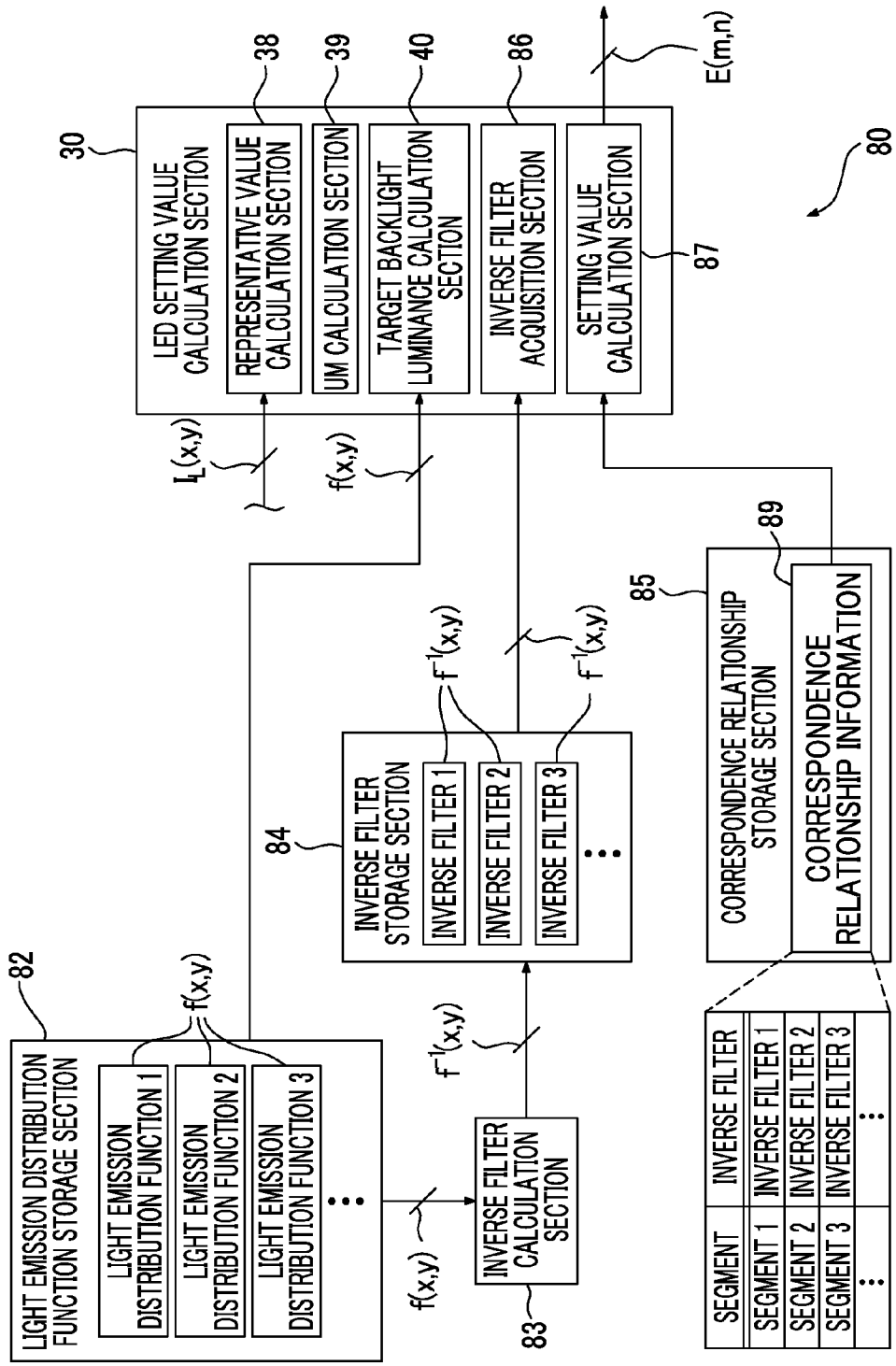
FIG. 26 is a block diagram illustrating an electrical configuration of a liquid crystal display device of a fourth embodiment.

Accordingly, as shown in FIG. 26, in a liquid crystal display device 80 of the fourth embodiment, the LED setting value E(m, n) is calculated using the optimal inverse filter $f^{-1}(x, y)$ for each segment region S(m, n). The liquid crystal display device 80 has basically the same as the liquid crystal display device 10 of the first embodiment except that the liquid crystal display device 80 includes a light emission distribution function storage section 82, an inverse filter calculation section 83, an inverse filter storage section 84, a correspondence relationship storage section 85, an inverse filter acquisition section 86, and a setting value calculation section 87. Hence, the components having the same functions and configurations as the first embodiment are represented by the same reference numerals and signs, and a description thereof will be omitted.

The light emission distribution function storage section 82 stores, in advance, the light emission distribution functions $f(x, y)$ [the light emission distribution function 1, the light emission distribution function 2, the light emission distribution function 3, . . . ] of the respective segment regions S(m, n). Each light emission distribution function $f(x, y)$ is a given value which is obtained in advance through measurement at the time of design or manufacture of the liquid crystal panel 15.

The inverse filter calculation section 83 calculates the inverse filters $f^{-1}(x, y)$ [the inverse filter 1, the inverse filter 2, the inverse filter 3, . . . ] of the respective light emission distribution functions $f(x, y)$ stored in the light emission distribution function storage section 82, by using Expression (15) mentioned above, and stores these inverse filters $f^{-1}(x, y)$ in the inverse filter storage section 84. It should be noted that the inverse filter storage section 84 is the same as the inverse filter storage section 27 of the first embodiment except that a plurality of types of the inverse filters $f^{-1}(x, y)$ is stored therein.

The correspondence relationship storage section 85 stores correspondence relationship information 89. The correspondence relationship information 89 indicates correspondence relationships between the respective segment regions S(m, n) [the segment region 1, the segment region 2, the segment region 3, . . . ] and the inverse filters $f^{-1}(x, y)$ of the light emission distribution functions $f(x, y)$ corresponding to the respective segment regions S(m, n). Accordingly, referring to the correspondence relationship information 89, it is possible to determine the inverse filters $f^{-1}(x, y)$ respectively appropriate for the respective segment regions S(m, n).

The inverse filter acquisition section 86 acquires a plurality of types of the inverse filters $f^{-1}(x, y)$ stored in the inverse filter storage section 84, and outputs these inverse filters $f^{-1}(x, y)$ to the setting value calculation section 87.

The setting value calculation section 87 selects the inverse filter $f^{-1}(x, y)$ corresponding to each segment region S(m, n) among the plurality of types of the inverse filters $f^{-1}(x, y)$, with reference to the correspondence relationship information 89 within the correspondence relationship storage section 85. Subsequently, the setting value calculation section 87 performs processing of a convolution operation (refer to Expression (14)) between the target backlight luminance $B_d(x, y)$ and the inverse filter $f^{-1}(x, y)$ selected in advance, for each segment region S(m, n), thereby calculating the LED setting value E(m, n) of each segment region S(m, n). Thereby, it is possible to calculate the LED setting value E(m, n) by using the optimal inverse filter $f^{-1}(x, y)$ for each segment region S(m, n).

<Effect of Liquid Crystal Display Device of Fourth Embodiment>

As described above, in the liquid crystal display device 80 of the fourth embodiment, the optimal inverse filter $f^{-1}(x, y)$ is selected, in consideration of the light emission distribution characteristics of the actual backlight structure, that is, in accordance with the characteristics of the LED 19 or the position of each segment region S(m, n) within the display screen. Thereby, it is possible to calculate the LED setting value E(m, n). As a result, it is possible to further precisely minimize information loss of the gray-level information of the highlighted region.

<Another Example of Fourth Embodiment>

In the fourth embodiment, the different inverse filters $f^{-1}(x, y)$ can be respectively associated with the segment regions S(m, n). However, the same inverse filters $f^{-1}(x, y)$ may be associated with the plurality of segment regions S(m, n) in accordance with the positions of the segment regions S(m, n) within the display screen.

In a manner similar to that of the fourth embodiment, also in the liquid crystal display device 60 of the second embodiment and the liquid crystal display device 70 of the third embodiment, the optimal inverse filter $f^{-1}(x, y)$ may be selected for each segment region S(m, n).

[Application Example of Smartphone]

In the above description of each embodiment, as the display device of the present invention, a television (monitor) type liquid crystal display device is exemplified. For example, the present invention can be applied to a mobile phone having a imaging function, a smartphone, a personal digital assistant (PDA), a tablet terminal, and a portable game machine. Hereinafter, a detailed description will be given of an example of a smartphone with reference to the accompanying drawings.

Figure 27:
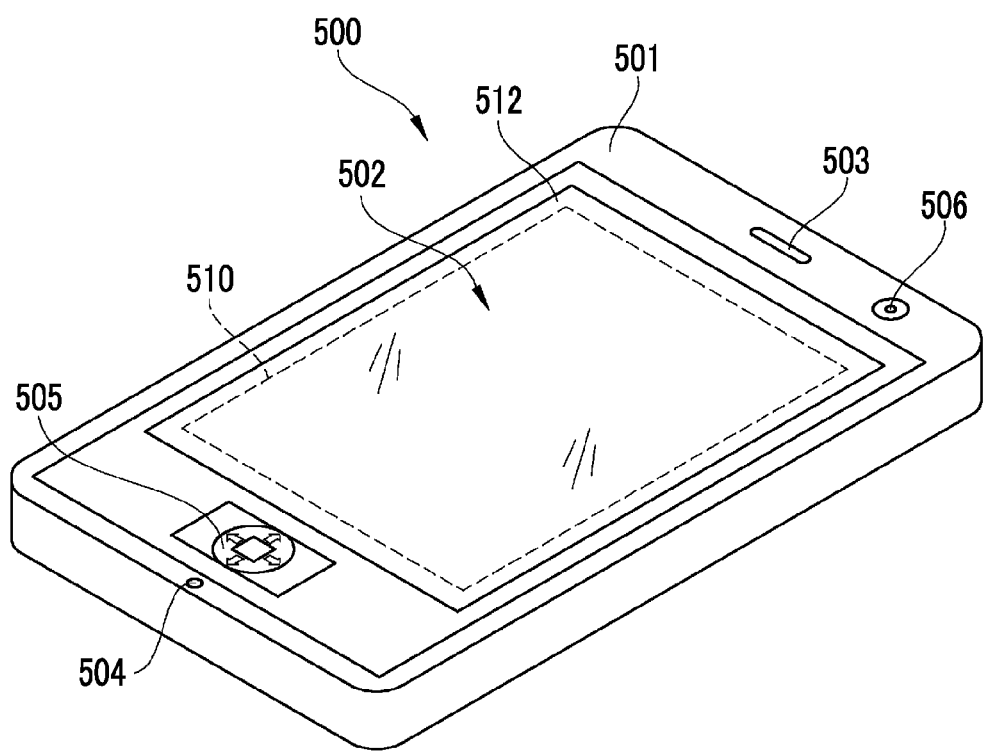
FIG. 27 is a perspective view of a smartphone.

FIG. 27 shows an appearance of a smartphone 500. The smartphone 500 has a housing 501 having a flat plate shape. On one side of the housing 501, there are provided a display input section 502, a speaker 503, a microphone 504, an operation section 505, and a camera section 506. It should be noted that the configuration of the housing 501 is not limited to this. For example, it may be possible to adopt a configuration in which the input section and the display section are independently provided, or it may be possible to adopt a configuration having a slide mechanism or a folded structure. Further, the camera section 506 is also provided on the other side of the housing 501.

The display input section 502 displays images (still image and moving image), text information, and the like. Further, the display input section 502 has a so-called touch panel structure for detecting a user operation for the displayed information. The display input section 502 includes a liquid crystal panel 510, a backlight 511 (refer to FIG. 28), and an operation panel 512.

The liquid crystal panel 510 and the backlight 511 are basically identical with the above-mentioned liquid crystal panel 15 and the backlight 16. The operation panel 512 has optical transparency, and is placed on a display screen of the liquid crystal panel 510. The operation panel 512 is a device that detects a single pair of coordinates or a plurality of pairs of coordinates at which an operation is performed by a user's finger or a stylus. If such a device is operated by a user's finger or a stylus, the device outputs a detection signal, which is generated due to the operation, to a CPU of the smartphone 500. The CPU detects an operation position (coordinates) on the liquid crystal panel 510, on the basis of the received detection signal. Examples of the position detection method used in the operation panel 512 may include a matrix switch method, a resistance film method, a surface elastic wave method, an infrared method, an electromagnetic induction method, and an electrostatic capacitance method, and the like.

Figure 28:
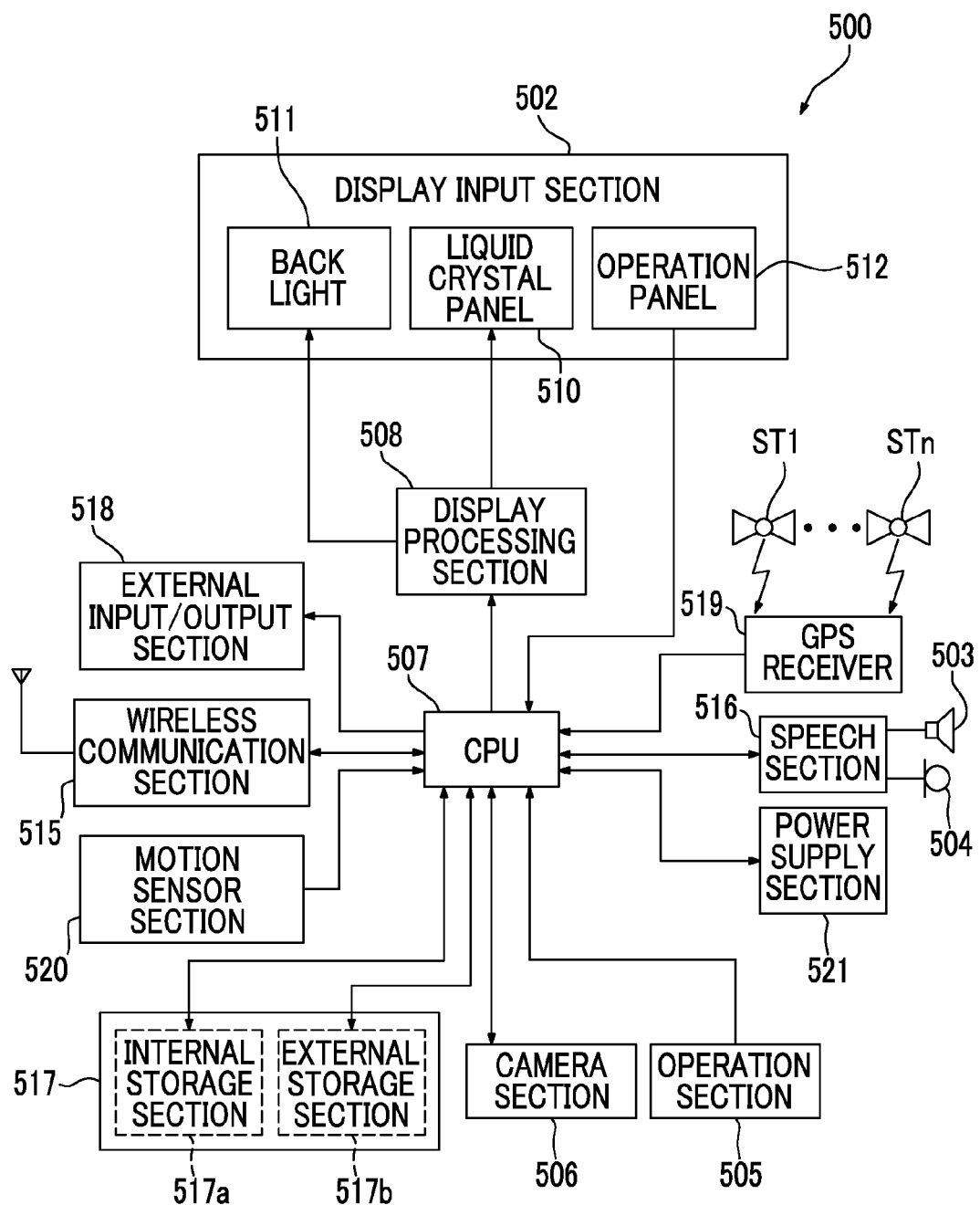
FIG. 28 is a block diagram illustrating an electrical configuration of the smartphone.

As shown in FIG. 28, the smartphone 500 includes the display input section 502, the speaker 503, the microphone 504, the operation section 505, the camera section 506, a CPU 507, a display processing section 508. In addition, the smartphone 500 also includes a wireless communication section 515, a speech section 516, a storage section 517, an external input/output section 518, a global positioning system (GPS) receiver 519, a motion sensor section 520, and a power supply section 521.

The operation section 505 is a hardware key using a push button type switch, an arrow key, or the like, for example, and accepts a command from a user. The operation section 505 is mounted in a lower portion of a display section of the housing 501, or in a side face of the housing 501, for example.

The camera section 506 performs electronic imaging by using various imaging elements such as a complementary metal oxide semiconductor (CMOS) imaging element and a charge-coupled device (CCD) imaging element. The image data, which is obtained by this electronic imaging, can be converted into various compressed image data, and recorded in the storage section 517, or can be output through the external input/output section 518 or the wireless communication section 515.

The display processing section 508 displays images or text information on the display input section 502, in accordance with an instruction of the CPU 507. This display processing section 508 functions as the image data acquisition section 21, the linear luminance conversion section 22, the light emission distribution function storage section 25, the inverse filter calculation section 26, the inverse filter storage section 27, the LED setting value calculation section 30, the backlight control section 31, the backlight luminance estimation section 32, the gray-level correction section 33, the gamma correction section 34, and the liquid crystal panel control section 35 shown in FIG. 4 in the above description.

The wireless communication section 515 performs wireless communication with the base station device, which is included in the mobile communication network, in accordance with an instruction of the CPU 507. Using this wireless communication, various kinds of file data such as audio data and image data, e-mail data, and the like are transmitted and received, and web data, streaming data, and the like are received.

The speech section 516 includes a speaker 503 and a microphone 504. The speech section 516 is able to convert a sound of a user, which is input through the microphone 504, into sound data, and output the data to the CPU 507, and decodes sound data, which is received by the wireless communication section 515 or the like, and outputs the data from the speaker 503.

The storage section 517 stores a control program and control data of the CPU 507, address data in which names, phone numbers, and the like of communication partners are associated, received and transmitted e-mail data, and the like, and temporarily stores streaming data and the like. Further, the storage section 517 is constituted of an internal storage portion 517a, which is built into the smartphone, and an external storage portion 517b which has a removable external memory slot. In addition, as the internal storage portion 517a and the external storage portion 517b, various known storage media such as a flash memory type and a hard disk type are used.

The external input/output section 518 has a function of an interface with all external devices connected to the smartphone 500, and is for direct or indirect connection to other external devices and the like through communication.

The GPS receiver 519 receives a plurality of GPS signals, which are transmitted from GPS satellites ST1 to STn, executes positioning calculation processing based on the received GPS signals, and detects a position formed of a latitude, a longitude, and an altitude of the smartphone 500. This detection result is output to the CPU 507.

The motion sensor section 520 includes, for example, a triaxial acceleration sensor, and detects physical movement of the smartphone 500. Thereby, an acceleration and a direction of the movement of the smartphone 500 are detected. This detection result is output to the CPU 507. Further, the power supply section 521 supplies the respective sections of the smartphone 500 with electric power which is stored in a battery not shown in the drawing.

The CPU 507 integrally controls the respective sections of the smartphone 500 by performing an operation on the basis of control data or a control program which is read from the storage section 517. Further, the CPU 507 executes display control for the liquid crystal panel 510 and operation detection control to detect the user operation through the operation section 505 and the operation panel 512.

Through execution of the display control, the CPU 507 displays an icon for activating application software, a window for displaying a software key such as a scroll bar or creating an e-mail, or the like, on the liquid crystal panel 510. In addition, the scroll bar means a software key for receiving an instruction to move a display portion of an image on a large image which cannot be entirely shown in the display region of the liquid crystal panel 510.

Through execution of the operation detection control, the CPU 507 detects the user operation performed through the operation section 505, receives an operation performed on the icon or a text input performed in an input field of the window through the operation panel 512, or receives a request to scroll a displayed image through the scroll bar.

The CPU 507 has a touch panel control function performed through execution of the operation detection control. The function determines whether the operation position of the operation panel 512 is in the overlapping part (display region) which overlaps with the liquid crystal panel 510 or the other part (non-display region) at the outer edge which does not overlap with the liquid crystal panel 510, and controls the display position of the software key or the sensing region of the operation panel 512.

The CPU 507 may detect a gesture operation performed on the operation panel 512, and may execute a preset function in response to the detected gesture operation. The gesture operation is not a simple touch operation used in the past. The gesture operation means an operation for drawing a locus with a finger or the like, an operation of specifying a plurality of positions at the same time, or an operation of drawing loci from a plurality of positions to at least one position as a combination of the above-mentioned operations.

The liquid crystal panel 510, the backlight 511, and the display processing section 508 of the smartphone 500 having the above configuration has a basically the same configuration as the liquid crystal display device of each embodiment. Therefore, it is possible to obtain effects the same as those of the embodiments.

[Others]

In the first embodiment, the inverse filter calculation section 26 within the liquid crystal display device 10 calculates the inverse filter $f^{-1}(x, y)$. However, the calculation of the inverse filter $f^{-1}(x, y)$ may be performed in an external section, and the inverse filter $f^{-1}(x, y)$ calculated in the external section may be stored in the inverse filter storage section 27. Further, the inverse filter acquisition section 41 may directly acquire the inverse filter $f^{-1}(x, y)$ calculated in the external section through the communication network or the like. In addition, it is the same for other embodiments. Furthermore, for example, in the case of another example of the second embodiment shown in FIG. 21, the inverse filter $f^{-1}(x, y)$ subjected to the high-frequency restriction processing may be calculated in an external section, and in the case of the third embodiment, the multiplication processing of the window function FW on the filter coefficient of the inverse filter $f^{-1}(x, y)$ may be also performed in the external section.

In the above-mentioned embodiments, the inverse filter $f^{-1}(x, y)$ is calculated using the Wiener filter. However, the inverse filter $f^{-1}(x, y)$ may be calculated using a general inverse filter, a parametric Wiener filter, a projection filter, a partial projection filter, or the like.

In the above-mentioned embodiments, an example of the transmissive liquid crystal display device having the liquid crystal panel 15 and the backlight 16, which is disposed on the rear side of the liquid crystal panel 15, was described. However, the present invention may be also applied to a liquid crystal display device in which a light source is disposed on the side face of the liquid crystal panel 15. Further, the present invention may be also applied to a reflective liquid crystal display device having a liquid crystal panel capable of controlling a reflectance for each pixel.

In the above-mentioned embodiments, an example of the liquid crystal display device having the liquid crystal panel 15 was described. However, the present invention may be also applied to display devices that have various non-self-luminous display panels of which a transmittance or a reflectance can be adjusted for each pixel by controlling driving of each pixel.

EXPLANATION OF REFERENCES 10, 60, 60a, 70, 80: liquid crystal display device
15: liquid crystal panel
16: backlight
21: image acquisition section
26: inverse filter calculation section
27: inverse filter storage section
30: LED setting value calculation section
31: backlight control section
32: backlight luminance estimation section
33: gray-level correction section
35: liquid crystal panel control section
38: representative value calculation section
39: UM calculation section
40: target backlight luminance calculation section
41, 86: inverse filter acquisition section
42, 87: setting value calculation section
63: high-frequency restriction processing section
73: window function multiplication processing section

What is claimed is:
1. A display device comprising:
a non-self-luminous display panel;
a light source that separately controls a luminance of each illumination arranged for each segment region which is obtained by segmenting a display region of the non-self-luminous display panel into a plurality of pieces;

an image data acquisition section that acquires image data;
a target luminance calculation section that calculates a target luminance which is a target value of a luminance of emitted light for each of the illumination arranged for each segment region on the premise of an ideal condition that emitted light of a certain segment region is not leaked into peripheral segment regions thereof, on the basis of the image data acquired by the image data acquisition section;
an inverse filter acquisition section that acquires an inverse filter of a light emission distribution function which represents light emission distribution characteristics dispersed across segment regions of the illumination arranged for each segment region;
a setting value calculation section that calculates a setting value of the luminance of the emitted light of the illumination for each segment region so as to minimize difference between estimated luminance which is an estimated value of a luminance of an emitted light of the illumination affected by setting values of luminance of emitted light of illuminations of peripheral segment regions and the target luminance, by performing a convolution operation on the target luminance for each segment region, which is calculated by the target luminance calculation section, with the inverse filter which is acquired by the inverse filter acquisition section; and
a light source control section that controls the luminance of the emitted light of the illumination for each segment region on the basis of the setting value for each segment region which is calculated by the setting value calculation section.

2. The display device according to claim 1, wherein the inverse filter acquisition section acquires the inverse filter that is calculated by an inverse filter calculation section which calculates the inverse filter of the light emission distribution function by using a Wiener filter.

3. The display device according to claim 1, further comprising a high-frequency restriction processing section that performs high-frequency restriction processing, which is for restricting an increase in amplitude on a higher frequency side than a specific spatial frequency, on the inverse filter which is acquired by the inverse filter acquisition section,
wherein the setting value calculation section performs the convolution operation by using the inverse filter subjected to the high-frequency restriction processing.

4. The display device according to claim 1,
wherein the inverse filter acquisition section acquires the inverse filter on which high-frequency restriction processing is performed by a high-frequency restriction processing section that performs the high-frequency restriction processing for restricting an increase in amplitude on a higher frequency side than a specific spatial frequency, and
wherein the setting value calculation section performs the convolution operation by using the inverse filter subjected to the high-frequency restriction processing.

5. The display device according to claim 1, further comprising a window function multiplication processing section that multiplies a window function by a filter coefficient of the inverse filter which is acquired by the inverse filter acquisition section,
wherein the setting value calculation section performs the convolution operation by using the inverse filter after the multiplication processing of the window function.

6. The display device according to claim 1, further comprising an inverse filter storage section that stores the inverse filters for the light emission distribution functions having a plurality of different types in accordance with either positions of the segment regions within the display region or characteristics of the light source for respective segment regions, or both,
wherein the inverse filter acquisition section acquires the plurality of types of the inverse filters from the inverse filter storage section, and
wherein the setting value calculation section selects the inverse filter corresponding to each segment region, and performs the convolution operation thereon.

7. The display device according to claim 6, further comprising a correspondence relationship storage section that stores a correspondence relationship between the segment region and the inverse filter corresponding to the pertinent segment region for each segment region,
wherein the setting value calculation section selects the inverse filter corresponding to each segment region with reference to the correspondence relationship storage section.

8. The display device according to claim 1, wherein the target luminance calculation section calculates a representative value of pixel values of the image data of each segment region, calculates a margin of gain for each segment region based on a calculation result of the representative value and a maximum value allowable in a pixel value for each segment region, calculates a target backlight luminance for each segment region based on the margin of the gain calculated for each segment region, and calculates the setting value of the luminance of the emitted light of the illumination for each segment region by performing a convolution operation on the target backlight luminance calculated for each segment region with the inverse filter of the light emission distribution function.

9. The display device according to claim 8, wherein the representative value is a peak value of the pixel values.

10. The display device according to claim 1, further comprising:
an estimation section that estimates the luminance of emitted light of the display region on the basis of the setting value for each segment region which is calculated by the setting value calculation section;
a gray-level correction section that performs gray-level correction on the pixel values of the image data on the basis of an estimation result of the estimation section; and
a panel control section that controls driving of pixels of the non-self-luminous display panel on the basis of the pixel values after the gray-level correction performed by the gray-level correction section.

11. A control method for a display device including a non-self-luminous display panel and a light source that separately controls a luminance of emitted light for each segment region which is obtained by segmenting a display region of the non-self-luminous display panel into a plurality of pieces, the control method comprising:
an image data acquisition step of acquiring image data;
a target luminance calculation step of calculating a target luminance which is a target value of a luminance of emitted light for each of the illumination arranged for each segment region on the premise of an ideal condition that emitted light of a certain segment region is not leaked into peripheral segment regions thereof, on the basis of the image data acquired in the image data acquisition step;
an inverse filter acquisition step of acquiring an inverse filter of a light emission distribution function which represents light emission distribution characteristics dispersed across segment regions of the illumination arranged for each segment region;

a setting value calculation step of calculating a setting value of the luminance of the emitted light of the illumination for each segment region so as to minimize difference between estimated luminance which is an estimated value of a luminance of an emitted light of the illumination affected by setting values of luminance of emitted light of illuminations of peripheral segment regions and the target luminance, by performing a convolution operation on the target luminance for each segment region, which is calculated in the target luminance calculation step, with the inverse filter which is acquired in the inverse filter acquisition step; and a light source control step of controlling the luminance of the emitted light of the illumination for each segment region on the basis of the setting value for each segment region which is calculated in the setting value calculation step.

* * * * *